(12) United States Patent
Liu

(10) Patent No.: US 11,836,629 B2
(45) Date of Patent: Dec. 5, 2023

(54) COMPUTATIONALLY EFFICIENT SOFTMAX LOSS GRADIENT BACKPROPAGATION

(71) Applicant: SambaNova Systems, Inc., Palo Alto, CA (US)

(72) Inventor: Chen Liu, San Jose, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 976 days.

(21) Appl. No.: 16/744,077

(22) Filed: Jan. 15, 2020

(65) Prior Publication Data

US 2021/0216873 A1    Jul. 15, 2021

(51) Int. Cl.
*G06N 3/04*       (2023.01)
*G06N 3/084*      (2023.01)
(Continued)

(52) U.S. Cl.
CPC ............... *G06N 3/084* (2013.01); *G06N 3/04* (2013.01); *G06N 3/048* (2023.01); *G06N 3/06* (2013.01); *G06N 3/063* (2013.01); *G06N 7/01* (2023.01)

(58) Field of Classification Search
CPC ........ G06N 3/084; G06N 3/04; G06N 3/0481; G06N 3/06; G06N 3/063; G06N 7/005
(Continued)

(56) References Cited

U.S. PATENT DOCUMENTS 5,365,465 A   11/1994  Larson
5,506,797 A    4/1996  Koshiba
(Continued)

FOREIGN PATENT DOCUMENTS

CN    109871235 A    6/2019
CN    110471643 A   11/2019
(Continued)

OTHER PUBLICATIONS

Geng, et al., "Hardware-Aware Softmax Approximation for Deep Neural Networks", ACCV 2018 (Year: 2018).*
(Continued)

*Primary Examiner* — Tsu-Chang Lee
(74) *Attorney, Agent, or Firm* — Flagship Patents; Sikander Khan; Bruce Young

(57) ABSTRACT

A computation unit comprises first, second, and third circuits. The first circuit traverses gradient loss elements $g_{pn}$ and normalized output elements $p_n$ and produces an accumulation C. The accumulation C is produced by element-wise multiplying the gradient loss elements $g_{pn}$ with the corresponding normalized output elements $p_n$ and summing the results of the element-wise multiplication. The second circuit, operatively coupled to the first circuit, element-wise subtracts the accumulation C from each of the gradient loss elements $g_{pn}$ and produces modulated gradient loss elements $g_{pn'}$. The third circuit, operatively coupled to the second circuit, traverses the modulated gradient loss elements $g_{pn'}$ and produces gradient loss elements $g_{xn}$ for a function preceding the softmax function. The gradient loss elements $g_{xn}$ are produced by element-wise multiplying the modulated gradient loss elements $g_{pn'}$ with the corresponding normalized output elements $p_n$.

20 Claims, 11 Drawing Sheets

(51) Int. Cl.
　　　*G06N 3/063*　　(2023.01)
　　　*G06N 3/06*　　(2006.01)
　　　*G06N 3/048*　　(2023.01)
　　　*G06N 7/01*　　(2023.01)

(58) Field of Classification Search
　　　USPC .......................................................... 706/20
　　　See application file for complete search history.

(56) References Cited

U.S. PATENT DOCUMENTS

| | | | |
|---|---|---|---|
| 6,256,653 | B1 | 7/2001 | Juffa et al. |
| 7,015,921 | B1 | 3/2006 | Trivedi et al. |
| 7,472,149 | B2 | 12/2008 | Endo |
| 8,184,317 | B2 | 5/2012 | Okamoto |
| 9,411,756 | B2 | 8/2016 | Nogueira et al. |
| 10,698,853 | B1 | 6/2020 | Grohoski et al. |
| 11,106,430 | B1 | 8/2021 | Kadkol et al. |
| 2003/0068097 | A1 | 4/2003 | Wilson et al. |
| 2005/0160129 | A1 | 7/2005 | Endo |
| 2012/0030203 | A1 | 2/2012 | Chiang et al. |
| 2013/0151576 | A1 | 6/2013 | Utz et al. |
| 2013/0262539 | A1 | 10/2013 | Wegener |
| 2013/0339564 | A1 | 12/2013 | Nogueira et al. |
| 2014/0040334 | A1 | 2/2014 | Burgess et al. |
| 2014/0222883 | A1 | 8/2014 | Pineiro et al. |
| 2017/0054449 | A1 | 2/2017 | Mani et al. |
| 2017/0244982 | A1 | 8/2017 | Fuldseth et al. |
| 2017/0322774 | A1 | 11/2017 | Zhang |
| 2017/0322805 | A1 | 11/2017 | Zohar et al. |
| 2018/0157465 | A1 | 6/2018 | Bittner et al. |
| 2018/0174022 | A1 | 6/2018 | Young |
| 2018/0220144 | A1 | 8/2018 | Su et al. |
| 2018/0329681 | A1 | 11/2018 | Zhang et al. |
| 2019/0042244 | A1 | 2/2019 | Henry et al. |
| 2019/0042922 | A1 | 2/2019 | Pillai et al. |
| 2019/0042924 | A1 | 2/2019 | Pasca et al. |
| 2019/0114139 | A1 | 4/2019 | Zhang |
| 2019/0114555 | A1 | 4/2019 | Akerib |
| 2019/0147323 | A1 | 5/2019 | Li et al. |
| 2019/0205734 | A1 | 7/2019 | Guntoro |
| 2019/0279075 | A1 | 9/2019 | Liu et al. |
| 2019/0340504 | A1* | 11/2019 | Lee ........................ G06N 3/063 |
| 2019/0341052 | A1 | 11/2019 | Allibhai |
| 2020/0134475 | A1 | 4/2020 | Hill et al. |
| 2020/0159544 | A1 | 5/2020 | Shah et al. |
| 2020/0159692 | A1 | 5/2020 | Shah et al. |
| 2020/0272882 | A1 | 8/2020 | Lo |
| 2020/0371805 | A1 | 11/2020 | Lutz |
| 2021/0034982 | A1 | 2/2021 | Sather et al. |
| 2021/0064341 | A1 | 3/2021 | Kuo et al. |
| 2021/0064372 | A1 | 3/2021 | Sun et al. |
| 2021/0072955 | A1 | 3/2021 | Mellempudi et al. |
| 2021/0216873 | A1 | 7/2021 | Liu |

FOREIGN PATENT DOCUMENTS

| | | |
|---|---|---|
| TW | I318337 B | 12/2009 |
| TW | I557641 B | 11/2016 |
| TW | 201935329 A | 9/2019 |
| WO | 2008036944 A1 | 3/2008 |
| WO | 2010142987 A1 | 12/2010 |
| WO | 2018100920 A1 | 6/2018 |
| WO | 2021046274 A1 | 3/2021 |
| WO | 2021067318 A1 | 4/2021 |
| WO | 2021108328 A1 | 6/2021 |
| WO | 2021126530 A1 | 6/2021 |

OTHER PUBLICATIONS a. Mutlu et al., "Computer Architecture: SIMD and GPUs (PartI)", Computer Architecture Lecture, Carnegie Mellon University, 2013 (Year: 2013).*

"Activation Function," Downloaded from Wikipedia on Aug. 16, 2019, 3 pages.

Basterretxea et al., "Approximation of sigmoid function and the derivative for hardware implementation of artificial neurons," IEE Proceedings—Circuits, Devices and Systems, vol. 151, Issue 1, Feb. 5, 2004, 7 pages.

Bendersky "The Softmax function and its derivative," https://eli.thegreenplace.net/2016/the-softmax-function-and-its-derivative, Oct. 18, 2016, 11 pages.

Cook, "Comparing bfloat16 range and precision to other 16-bit numbers," www.johndcook.com/blog/2018/11/15/bfloat16, downloaded on Nov. 15, 2018, 4 pages.

Eppler et al. ,"High speed neural network chip for trigger purposes in high energy physics," IEEE, Proc. of the conference on design, automation and test in Europe, Feb. 1998, 8 pages.

Gomar et al. "Precise digital implementations of hyperbolic tanh and sigmoid function," 2016 50th Asilomar Conference on Signals, Systems and Computers, Nov. 6-9, 2016, 4 pages.

Intel BLOAT16—Hardware Numerics Definition White Paper, Rev. 1.0, Nov. 2018, 7 pages.

Ioffe, et al., "Batch Normalization: Accelerating Deep Network Training by Reducing Internal Covariate Shift," Cornell University, available at https://arxiv.org/abs/1502.03167, Mar. 2, 2015, 11 pages.

Koeplinger et al., "Spatial: A Language and Compiler for Application Accelerators," PLDI '18, Jun. 18-22, 2018, Association for Computng Machinery, 16 pages.

Lin et al., "A Digital Circuit Design of Hyperbolic Tangent Sigmoid Function for Neural Networks," 2018 IEEE Int'l Symp. on Circuits and Systems, May 18-21, 2018, 4 pages.

Petersen, "Softmax with cross-entropy," https://mattpetersen.github.io/softmax-with-cross-entropy, Jun. 25, 2017, 19 pages.

Prabhakar, et al., "Plasticine: A Reconfigurable Architecture For Parallel Patterns", pp. 389-402, IEEE, Jun. 24, 2017.

Turkson et al. "Artificial neural network applications in the calibration of spark-ignition engines: An overview," Engineering Science and Technology, an International Journal, vol. 19, Issue 3, Sep. 2016, 1346-1359.

U.S. Appl. No. 16/260,548 "Matrix Normal/Transpose Read and a Reconfigurable Data Processor Including Same," filed Jan. 29, 2019, 43 pages.

U.S. Appl. No. 16/407,675 "Control Flow Barrier and Reconfigurable Data Processor," filed May 9, 2019, 32 pages.

U.S. Appl. No. 16/504,627 "Quiesce Reconfigurable Data Processor," filed Jul. 8, 2019, 78 pages.

U.S. Appl. No. 16/536,192 "Compiler Flow Logic for Reconfigurable Architectures ," filed Aug. 8, 2019, 57 pages.

U.S. Appl. No. 16/572,516 "Efficient Execution of Operation Unit Graphs on Reconfigurable Architectures Based on User Specification ," filed Sep. 16, 2019, 63 pages.

U.S. Appl. No. 16/560,057 "Sigmoid Function in Hardware and a Reconfigurable Data Processor Including Same" filed Sep. 4, 2019, 35 pages.

U.S. Appl. No. 16/572,527 "Performance Estimation-Based Resource Allocation for Reconfigurable Architectures" filed Sep. 16, 2019, 68 pages.

U.S. Appl. No. 16/590,058 "Computation Units for Functions Based on Lookup Tables" filed Oct. 1, 2019, 37 pages.

U.S. Appl. No. 16/688,069"Look-Up Table with Input Offsetting" dated Nov. 19, 2019, 36 pages.

U.S. Appl. No. 16/695,138"Computational Units for Batch Normalization" filed Nov. 25, 2019, 47 pages.

U.S. Appl. No. 16/718,094 "Computational Units for Element Approximation" filed Dec. 17, 2019, 87 pages.

Wikipedia "bfloat16 floating-point format," downloaded Aug. 19, 2019, 2 pages.

Wikipedia "Floor and ceiling functions," downloaded Aug. 12, 2019, 5 pages.

U.S. Appl. No. 16/688,069 dated Jan. 29, 2021, 18 pages.

Iqbal, "Reconfigurable Processor Artchitecture for High Speed Applications," IEEE Int'l Advance Computing Conference (IACC 2009), Patiala, India, Mar. 6-7, 2009, 6 pages.

Olukotun, "Designing Computer Sytems for Software 2.0," ISCA 2018 keynote, Jun. 2018, 49 pages.

(56) References Cited

OTHER PUBLICATIONS

PCT/US2020/49285—International Search Report and Written Opinion dated Nov. 18, 2020, 13 pages.
PCT/US2020/061862—International Search Report and Written Opinion dated Mar. 10, 2021, 11 pages.
Wikipedia "Batch normalization," [retrieved—on Feb. 25, 2021] Retrieved from the Internet: <URL: https://en.wikipedia.org/w/index.php?title=Batch normalization&oldid=908065963>, 10 pages.
US 16/695,138—Non-Final Office Action dated Apr. 22, 2021, 11 pages.
U.S. Appl. No. 16/590,058—Office Action dated Jun. 1, 2021, 9 pages.
U.S. Office Action in U.S. Appl. No. 16/688,069 dated Jun. 3, 2021, 9 pages.
Anonymous: "Rounding to 0.5", Arduino Forum, Aug. 28, 2017, 4 pages.
PCT/US2020/062905—International Search Report and Written Opinion dated Mar. 22, 2021, 14 pages.
MISB ST 1201.4, "Floating Point to Integer Mapping," Feb. 28, 2019, pp. 1-21.
Pasupuleti-etal, Low Complex High Accuracy Computation Approximations to Enable on device RNN Applications, May 26, 2019, 5 pages.
PCT/US2020/053344—International Search Report and Written Opinion dated Dec. 21, 2020, 11 pages.
PCT/US2020/061060—International Search Report and Written Opinion dated Mar. 4, 2021, 14 pages.
U.S. Appl. No. 16/590,058—Response to Non-Final Office Action dated Jun. 1, 2021 as filed Aug. 18, 2021, 20 pages.
U.S. Appl. No. 16/695,138—Response to Non-Final Office Action dated Apr. 22, 2021 as filed Jul. 22, 2022, 8 pages.
U.S. Appl. No. 16/688,069—Response to Non-Final Office Action dated Jan. 29, 2021, as filed Mar. 31, 2021, 20 pages.
TW 109129892—First Office Action dated Aug. 12, 2021, 19 pages.
TW 109134270—First Office Action dated Sep. 30, 2021, 6 pages.
U.S. Appl. No. 16/688,069—Notice of Allowance dated Sep. 22, 2021, 26 pages.
Podobas et al., A Survey on Coarse-Grained Reconfigurable Architectures From a Performance Perspective, IEEEAccess, vol. 2020. 3012084, Jul. 27, 2020, 25 pages.
M. Emani et al., "Accelerating Scientific Applications With SambaNova Reconfigurable Dataflow Architecture," in Computing in Science & Engineering, vol. 23, No. 2, pp. 114-119, Mar. 1-Apr. 2021, doi: 10.1109/MCSE.2021.3057203.
U.S. Appl. No. 16/590,058 Notice of Allowance, dated Nov. 3, 2021, 15 pages.
U.S. Appl. No. 16/695,138 Final Office Action, dated Oct. 21, 2021, 12 pages.
U.S. Appl. No. 16/688,069—Response to Non-Final Office Action dated Jun. 3, 2021, as filed Sep. 3, 2021, 9 pages.
U.S. Appl. No. 16/718,094 Notice of Allowance, dated Jun. 14, 2021, 15 pages.
TW 109129892—Response to First Office Action dated Oct. 21, 2021, 17 pages.
TW 109129892 Notice of Allowance, dated Nov. 1, 2021, 3 pages.
U.S. Appl. No. 16/695,138—Response to Final Office Action dated Oct. 21, 2021, filed Jan. 13, 2022, 10 pages.
TW 109140964 First Office Action, dated Jan. 12, 2022, 10 pages.
U.S. Appl. No. 16/688,069 Notice of Allowance, dated Jan. 14, 2022, 22 pages.
TW 109140965 First Office Action, dated Dec. 21, 2021, 8 pages.
TW 109134270—Response to First Office Action dated Sep. 30, 2021, filed Dec. 29, 2021, 13 pages.
TW 109139904 First Office Action, dated Nov. 22, 2021, 15 pages.
U.S. Appl. No. 16/695,138 Notice of Allowance, dated Feb. 10, 2022, 17 pages.
U.S. Appl. No. 16/560,057 Notice of Allowance, dated Feb. 9, 2022, 46 pages.
U.S. Appl. No. 16/590,058 Notice of Allowance, dated Feb. 18, 2022, 10 pages.
TW 109139904—Response to First Office Action dated Nov. 22, 2021, filed Feb. 23, 2022, 58 pages.
PCT/US2020/049285—International Preliminary Report on Patentability, dated Mar. 17, 2022, 8 pages.
TW 109140964—Response to First Office Action dated Jan. 12, 2022, filed Apr. 13, 2022, 67 pages.
TW 109134270—Notice of Allowance, dated Jan. 27, 2022, 3 pages.
TW 109140965—Notice of Allowance with translation dated Apr. 20, 2022, 3 pages.
TW 109139904—Notice of Allowance with translation dated Aug. 17, 2022, 3 pages.
PCT/US2020/053344—International Preliminary Report on Patentability, dated Apr. 14, 2022, 8 pages.
PCT/US2020/061862—International Preliminary Report on Patentability, dated Jun. 9, 2022, 8 pages.
PCT/US2020/061060—International Preliminary Report on Patentability, dated Jun. 2, 2022, 8 pages.
PCT/US2020/062905—International Preliminary Report on Patentability, dated Jun. 30, 2022, 8 pages.

* cited by examiner

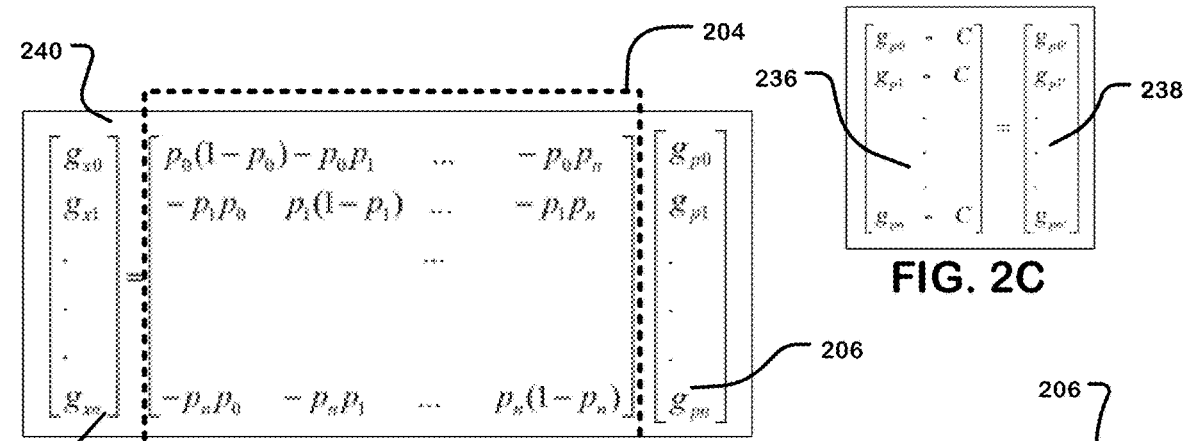
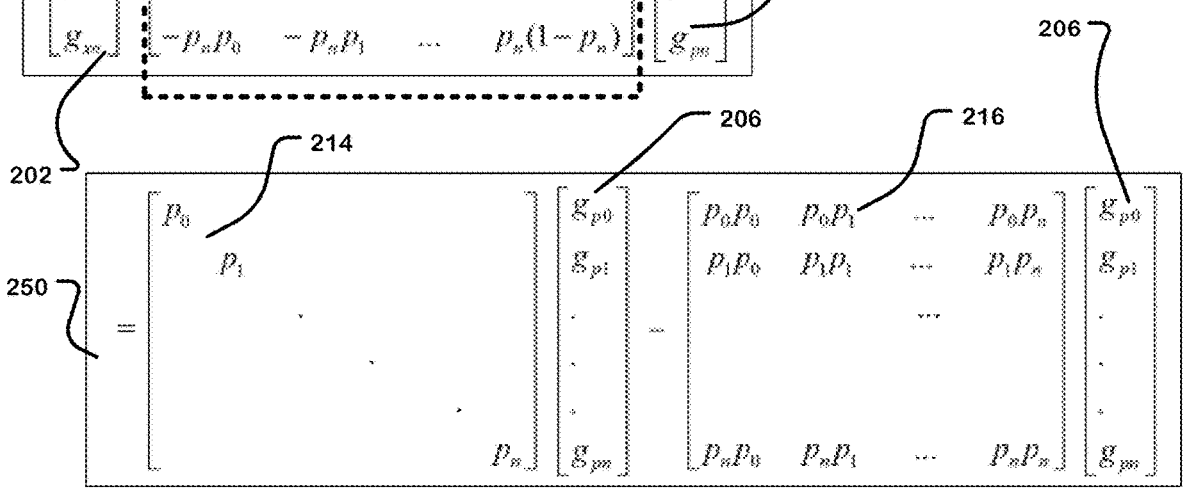
FIG. 2C
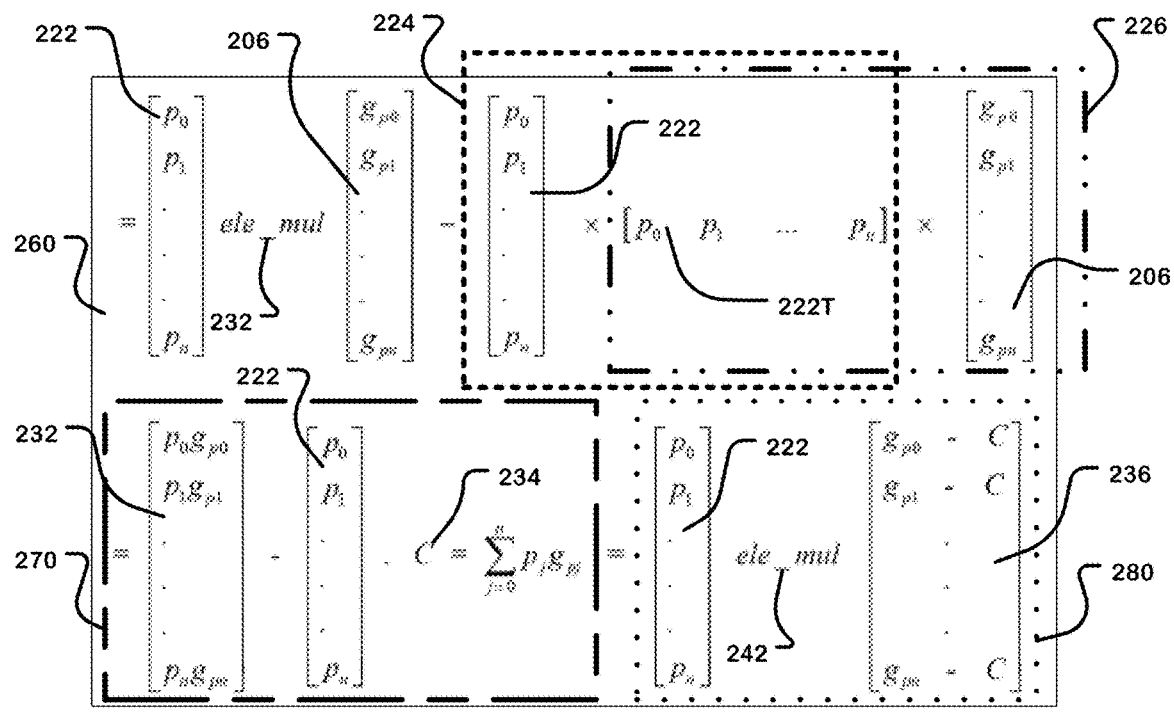
FIG. 2B

300

302 traversing, by a first circuit, gradient loss elements $g_{pa}$ of a softmax function, and normalized output elements $p_k$ of the softmax function, and producing an accumulation $C$

312 element-wise subtracting, by a second circuit, the accumulation $C$ from each of the gradient loss elements $g_{pa}$, and producing modulated gradient loss elements $g_{pa'}$

322 traversing, by a third circuit, the modulated gradient loss elements $g_{pa'}$ and producing gradient loss elements $g_{xa}$ for a function preceding the softmax function

FIG. 3

COMPUTATIONALLY EFFICIENT SOFTMAX LOSS GRADIENT BACKPROPAGATION

FIELD OF THE TECHNOLOGY DISCLOSED

The present invention relates to technology of low power, compact implementations of activation functions, including softmax function's loss gradient backpropagation, such as commonly utilized in machine learning.

INCORPORATIONS

The following are incorporated by reference for all purposes as if fully set forth herein:

Koeplinger et al., "Spatial: A Language And Compiler For Application Accelerators," *Proceedings Of The* 39th *ACM SIGPLAN Conference On Programming Language Design And Implementation* (PLDI), Proceedings of the 43rd International Symposium on Computer Architecture, 2018;

Prabhakar et al., "Plasticine: A Reconfigurable Architecture for Parallel Patterns," ISCA '17, Jun. 24-28, 2017, Toronto, ON, Canada;

U.S. Nonprovisional patent application Ser. No. 16/239, 252, filed Jan. 3, 2019, entitled, "VIRTUALIZATION OF A RECONFIGURABLE DATA PROCESSOR,";

U.S. Nonprovisional patent application Ser. No. 16/197, 826, filed Nov. 21, 2018, entitled, "CONFIGURATION LOAD OF A RECONFIGURABLE DATA PROCESSOR,";

U.S. Nonprovisional patent application Ser. No. 16/198, 086, filed Nov. 21, 2018, entitled, "CONFIGURATION UNLOAD OF A RECONFIGURABLE DATA PROCESSOR,";

U.S. Nonprovisional patent application Ser. No. 16/260, 548, filed Jan. 29, 2019, entitled, "MATRIX NORMAL/TRANSPOSE READ AND A RECONFIGURABLE DATA PROCESSOR INCLUDING SAME,";

U.S. Nonprovisional patent application Ser. No. 16/536, 192, filed Aug. 8, 2019, entitled, "COMPILER FLOW LOGIC FOR RECONFIGURABLE ARCHITECTURES,";

U.S. Nonprovisional patent application Ser. No. 16/407, 675, filed May 9, 2019, entitled, "CONTROL FLOW BARRIER AND RECONFIGURABLE DATA PROCESSOR,";

U.S. Nonprovisional patent application Ser. No. 16/504, 627, filed Jul. 8, 2019, entitled, "QUIESCE RECONFIGURABLE DATA PROCESSOR,";

U.S. Nonprovisional patent application Ser. No. 16/572, 516, filed Sep. 16, 2019, entitled, "EFFICIENT EXECUTION OF OPERATION UNIT GRAPHS ON RECONFIGURABLE ARCHITECTURES BASED ON USER SPECIFICATION,";

U.S. Nonprovisional patent application Ser. No. 16/590, 058, filed Oct. 1, 2019, entitled, "COMPUTATION UNITS FOR FUNCTIONS BASED ON LOOKUP TABLES,";

U.S. Nonprovisional patent application Ser. No. 16/695, 138, filed Nov. 25, 2019, entitled, "COMPUTATION UNITS FOR BATCH NORMALIZATION,";

U.S. Nonprovisional patent application Ser. No. 16/688, 069, filed Nov. 19, 2019, entitled, "LOOK-UP TABLE WITH INPUT OFFSETTING,";

U.S. Nonprovisional patent application Ser. No. 16/718, 094, filed Dec. 17, 2019, entitled, "COMPUTATION UNITS FOR ELEMENT APPROXIMATION,";

U.S. Nonprovisional patent application Ser. No. 16/560, 057, filed Sep. 4, 2019, entitled, "SIGMOID FUNCTION IN HARDWARE AND A RECONFIGURABLE DATA PROCESSOR INCLUDING SAME,"; and U.S. Nonprovisional patent application Ser. No. 16/572, 527, filed Sep. 16, 2019, entitled, "PERFORMANCE ESTIMATION-BASED RESOURCE ALLOCATION FOR RECONFIGURABLE ARCHITECTURES,".

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Machine learning networks, such as recurrent and convolutional neural networks, can include arrays of computation units analogous to "neurons" arranged in many layers. In some implementations, these computation units can execute functions, such as a sum-of-products, that produce an intermediate value, which is then transformed using an activation function to produce the output of the units. A variety of activation functions have been utilized, including rectified linear unit (ReLU), sigmoid, hyperbolic tangent, softmax, and others. Activation functions can consume a substantial portion of the computational resources of the system.

A softmax function can be implemented using typical arithmetic logic unit (ALU) circuits having adders, multipliers and dividers, for example. Also, the softmax function can be implemented using a look-up table. However, the ALU and look-up table approach can involve latencies making them unsuitable for some high-performance implementations. Alternatively, the look-up table can be compiled to form a combinational logic circuit to provide the result of the softmax function.

However, such circuits are large and consume significant power at high speeds. As machine learning based technologies are more widely deployed, it is becoming important to implement them at low cost using flexible architectures. In such architectures, including integrated circuit components, area, and power consumption are critical design parameters. One class of integrated circuits includes reconfigurable processors, including field programmable gate arrays (FPGAs), which can be configured to implement a variety of functions more efficiently or faster than might be achieved using a general-purpose processor executing a computer program. So-called coarse-grain reconfigurable architectures (CGRAs) are being developed in which the configurable units in the array are more complex than used in typical, more fine-grained FPGAs, and may enable faster or more efficient execution of various classes of functions. For example, CGRAs have been proposed that can enable implementation of energy-efficient accelerators for machine learning and artificial intelligence workloads. See, Prabhakar, et al., "Plasticine: A Reconfigurable Architecture for Parallel Patterns," ISCA '17, Jun. 24-28, 2017, Toronto, ON, Canada.

It is therefore desirable to reduce the number of computationally expensive hardware operations required for calculating the softmax function's loss gradient backpropagation, which can be applied as activation functions, including implementations suitable for use in integrated circuits, including as modules in programmable processors such as coarse-grain reconfigurable architecture (CGRA) devices.

SUMMARY

We disclose a computationally efficient way of implementing non-linear functions, including a softmax function, usable as activation functions in machine learning and in other environments. The technique can be applied in an integrated circuit, such as a reconfigurable data processor.

In one implementation, a computation unit is described that comprises first, second, and third circuits. The first circuit traverses gradient loss elements $g_{pn}$ and normalized output elements $p_n$ and produces an accumulation C. The accumulation C is produced by element-wise multiplying the gradient loss elements $g_{pn}$ with the corresponding normalized output elements $p_n$ and summing the results of the element-wise multiplication. The second circuit, operatively coupled to the first circuit, element-wise subtracts the accumulation C from each of the gradient loss elements $g_{pn}$ and produces modulated gradient loss elements $g_{pn'}$. The third circuit, operatively coupled to the second circuit, traverses the modulated gradient loss elements $g_{pn'}$ and produces gradient loss elements $g_{xn}$ for a function preceding the softmax function. The gradient loss elements $g_{xn}$ are produced by element-wise multiplying the modulated gradient loss elements $g_{pn'}$ with the corresponding normalized output elements $p_n$.

In one implementation, the computation unit is further configured to generate a Jacobian matrix by determining a partial derivative of the normalized output elements $p_n$ of the softmax function over unnormalized input elements $x_n$ to the softmax function, decompose the Jacobian matrix into diagonal entries and off-diagonal entries, further decompose the off-diagonal entries into a vector of the normalized output elements $p_n$ and a transpose $p_n^T$ of the vector of the normalized output elements $p_n$, element-wise multiply the gradient loss elements $g_{pn}$ with the corresponding normalized output elements $p_n$ of the transpose $p_n^T$, and sum the results of the element-wise multiplication to produce the accumulation C.

In one implementation, the gradient loss elements $g_{pn}$ of the softmax function are determined for a current classification module using backpropagation based on a loss function. In some implementations, the current classification module is part of a neural network. In one implementation, the neural network is a deep neural network.

In one implementation, the number of multiplication operations required to produce the gradient loss elements $g_{xn}$ of the function preceding the softmax function are reduced from $n^2$ to n, where n is the dimensionality of the gradient loss elements $g_{pn}$ of the softmax function, the gradient loss elements $g_{xn}$ of the function preceding the softmax function, the normalized output elements $p_n$ of the softmax function, and the unnormalized input elements $x_n$ to the softmax function.

In one implementation, the first circuit receives the gradient loss elements $g_{pn}$ of the softmax function and the normalized output elements $p_n$ of the softmax function in a first format and stores the accumulation C in a second format, with the second format having more bits than the first format. In some implementations, the first format is Brain floating-point format 16 (bfloat16) and the second format is floating point 32 (FP32).

In one implementation, the second circuit converts the gradient loss elements $g_{pn}$ into the second format from the first format and produces the modulated gradient loss elements $g_{pn'}$ in the second format.

In one implementation, the third circuit converts the normalized output elements $p_n$ into the second format from the first format and produces the gradient loss elements $g_{xn}$ for the function preceding the softmax function in the second format. In some implementations, the third circuit converts the gradient loss elements $g_{xn}$ into the first format from the second format and makes them available in the first format for downstream processing.

Methods as described herein can be applied in data processing systems to efficiently compute the softmax function's loss gradient backpropagation.

Reconfigurable processors as described herein, including an array of configurable units, can include configurable units configured to implement a computation unit to efficiently compute the softmax function's loss gradient backpropagation.

Other aspects and advantages of the present invention can be seen on review of the drawings, the detailed description and the claims, which follow.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

FIGS. 2B and 2C illustrate how the technology disclosed decomposes the softmax Jacobian matrix into a formulation that reduces compute complexity, for the calculation of the softmax function's loss gradient backpropagation, from $O(n^2)$ to $O(n)$.

FIG. 3 describes a method of calculating the softmax function's loss gradient backpropagation in the disclosed computationally efficient way.

DETAILED DESCRIPTION

Figure 1:
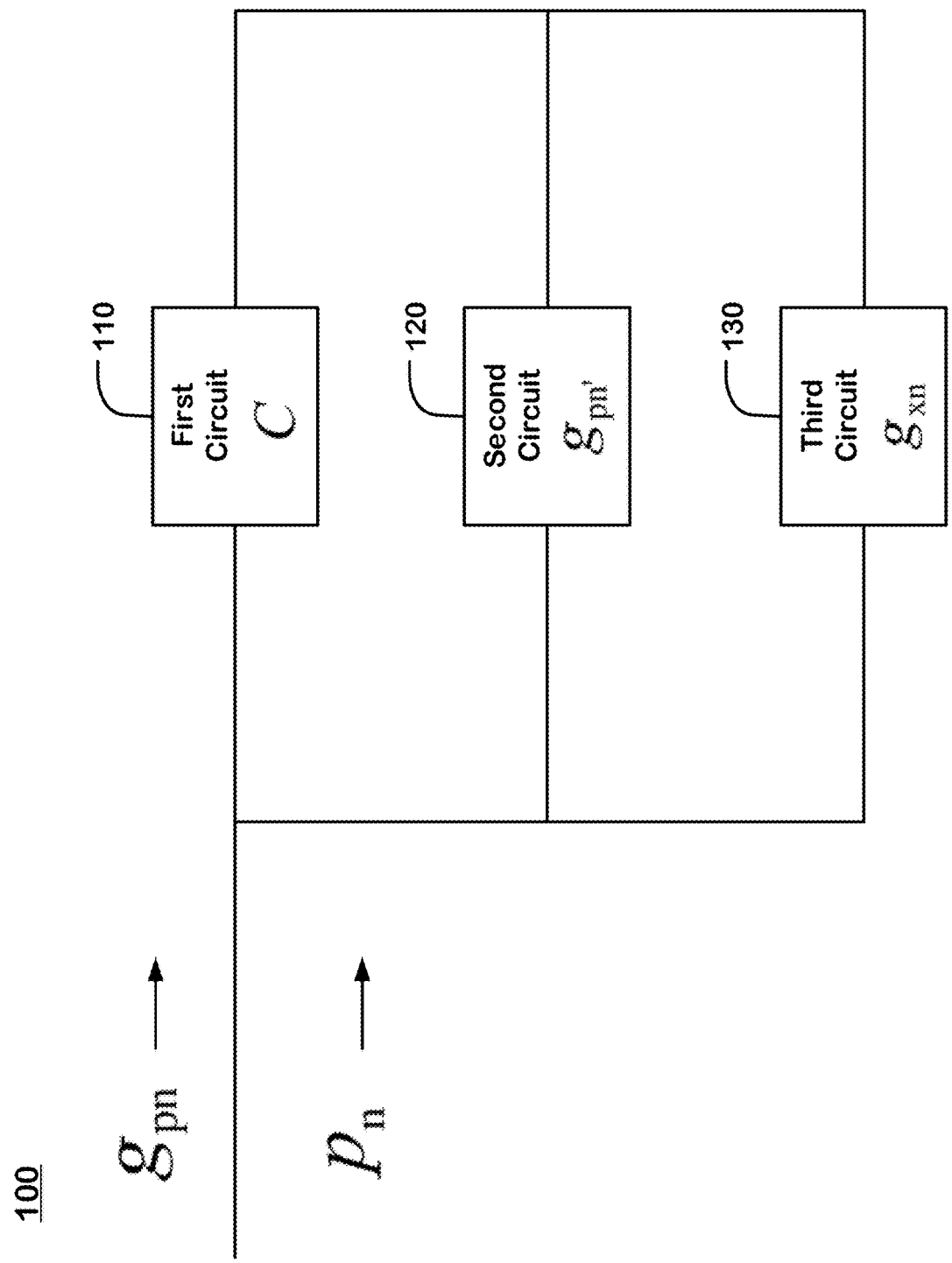
FIG. 1 is a schematic diagram of a computation unit 100 that implements the disclosed computationally efficient way of calculating the softmax function's loss gradient backpropagation on hardware circuitry.

The following description will typically be with reference to specific structural embodiments and methods. It is to be understood that there is no intention to limit the technology to the specifically disclosed embodiments and methods but that the technology may be practiced using other features, elements, methods and embodiments. Preferred embodiments are described to illustrate the present technology, not to limit its scope, which is defined by the claims. Those of ordinary skill in the art will recognize a variety of equivalent variations on the description that follows.

This discussion is organized as follows. First, FIGS. 2A, 2B, and 2C describe the softmax function, the softmax Jacobian matrix and its decomposition, and the disclosed compute complexity reduction in calculating the softmax function's loss gradient backpropagation. Then, FIG. 1 describes a computation unit that implements the disclosed compute complexity reduction on hardware circuitry. FIG. 3 describes a method of calculating the softmax function's loss gradient backpropagation in the disclosed computationally efficient way. Finally, FIGS. 4 to 10 describe various embodiments of implementing the technology disclosed on a reconfigurable processor.

Softmax

Softmax function is a preferred function for multi-class classification. The softmax function calculates the probabilities of each target class over all possible target classes. The output range of the softmax function is between zero and one and the sum of all the probabilities is equal to one. The softmax function computes the exponential of the given input value and the sum of exponential values of all the input values. The ratio of the exponential of the input value and the sum of exponential values is the output of the softmax function, referred to herein as "exponential normalization."

Formally, training a so-called softmax classifier is regression to a class probability, rather than a true classifier as it does not return the class but rather a confidence prediction of each class's likelihood. The softmax function takes a class of values and converts them to probabilities that sum to one. The softmax function squashes a n-dimensional vector of arbitrary real values to n-dimensional vector of real values within the range zero to one. Thus, using the softmax function ensures that the output is a valid, exponentially normalized probability mass function (nonnegative and summing to one).

Intuitively, the softmax function is a "soft" version of the maximum function. The term "soft" derives from the fact that the softmax function is continuous and differentiable. Instead of selecting one maximal element, it breaks the vector into parts of a whole with the maximal input element getting a proportionally larger value, and the other getting a less proportion of the value. The property of outputting a probability distribution makes the softmax function suitable for probabilistic interpretation in classification tasks.

Let us consider z as a vector of inputs to the softmax layer. The softmax layer units are the number of nodes in the softmax layer and therefore, the length of the z vector is the number of units in the softmax layer (if we have ten output units, then there are ten z elements).

For an n-dimensional vector $Z=[z_1, z_2, \ldots z_n]$, the softmax function uses exponential normalization (exp) to produce another n-dimensional vector p(Z) with normalized values in the range [0, 1] and that add to unity:

$$Z = \begin{bmatrix} z_1 \\ z_2 \\ \vdots \\ z_n \end{bmatrix} \text{ and, } p(Z) \rightarrow \begin{bmatrix} p_1 \\ p_2 \\ \vdots \\ p_n \end{bmatrix}$$

-continued $$p_j = \frac{\exp^{z_j}}{\sum_{k=1}^{n} \exp^{z_k}} \forall j \in 1, 2, \ldots, n$$

Figure 2A:
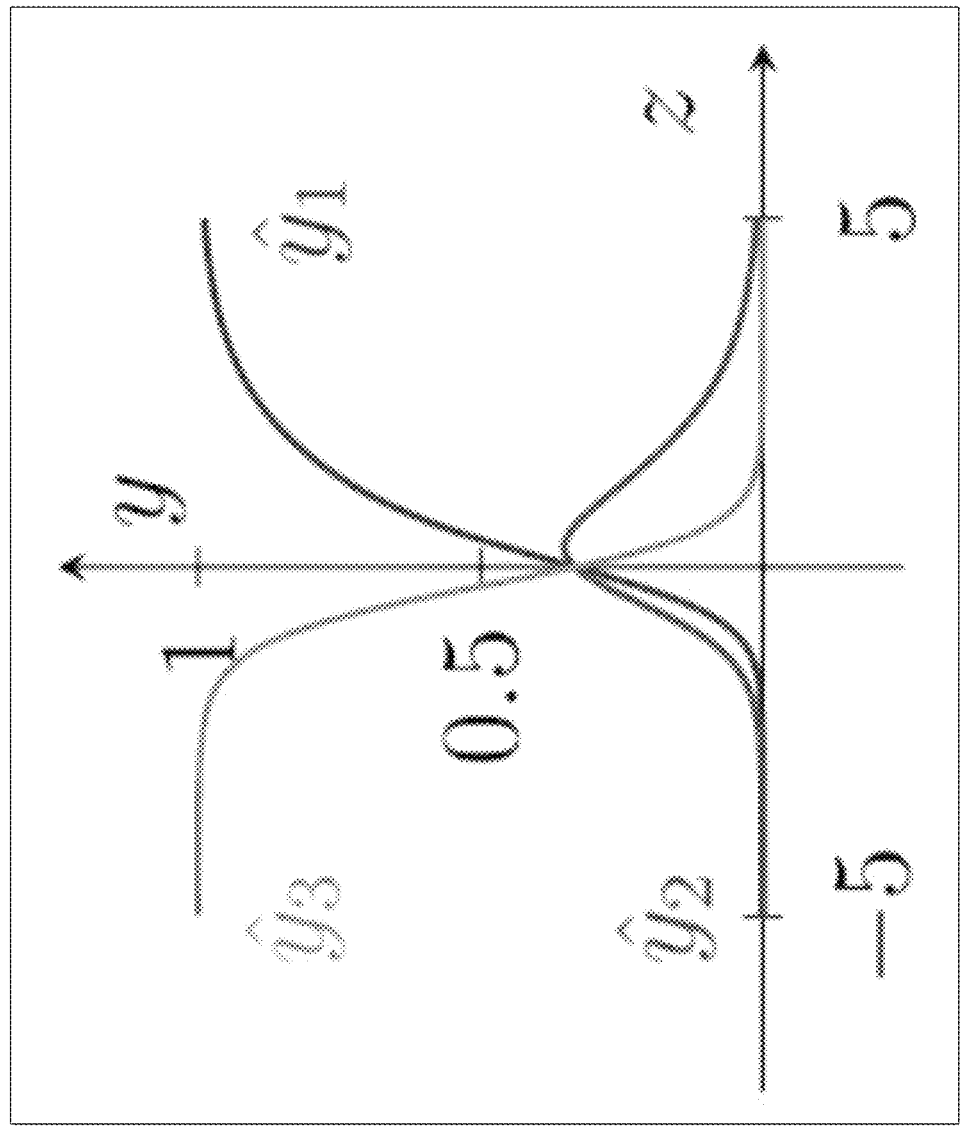
FIG. 2A shows an example softmax function.

An example softmax function 200 is shown in FIG. 2A. Softmax function 200 is applied to three classes as z→softmax([z; z/10; −2z]). Note that the three outputs always sum to one. They thus define a discrete probability mass function.

In FIG. 2B, elements of the vector p(Z) with normalized values are referred to as normalized output elements $p_n$ 222 of the softmax function, and their transpose is referred to as transpose $p_n^T$ 222T of the vector of the normalized output elements $p_n$ 222.

Softmax function can be used in a final output layer of a neural network or in a hidden layer of the neural network.

Derivative of Softmax

The derivative of a function is the rate of change of one quantity over another. This implies we can measure the rate of change of the output error (loss) with respect to the weights of the neural network. If we know how the error changes with respect to the weights, we can change those weights in a direction that decreases the error.

The partial derivative of a function is the rate of change of one quantity over another, irrespective of another quantity if more than two factors are in the function. Partial derivatives come into play because we train neural networks with gradient descent-based backpropagation, where we deal with multiple variables.

During backpropagation, derivatives of the softmax layer are passed back to the previous/preceding layer. Since the softmax function takes multiple inputs in the form of a vector and produces multiple outputs in the form of an output vector, we need to specify which output component of the softmax function we are seeking to find the derivative of.

The softmax function can be interpreted as $p_i = P(y=i|z)$, where the output class is represented as $y \in 1, \ldots n$ and z is an n-dimensional vector.

The partial derivative of the ith output $p_i$ with respect to the jth input $z_j$ can be represented as $$\frac{\partial p_i}{\partial z_j}.$$

The derivative matrix (which is a Jacobian matrix) of the softmax function can be represented as follows and is depicted in FIG. 2B as softmax Jacobian matrix 204:

$$\frac{\partial p}{\partial z} = \begin{bmatrix} \frac{\partial p_1}{\partial z_1} & \frac{\partial p_1}{\partial z_2} & \cdots & \frac{\partial p_1}{\partial z_n} \\ \frac{\partial p_2}{\partial z_1} & \frac{\partial p_2}{\partial z_2} & \cdots & \frac{\partial p_2}{\partial z_n} \\ \vdots & \vdots & \vdots & \vdots \\ \frac{\partial p_n}{\partial z_1} & \frac{\partial p_n}{\partial z_2} & \cdots & \frac{\partial p_n}{\partial z_n} \end{bmatrix}$$

For an arbitrary i and j, the derivative $$\frac{\partial p_i}{\partial z_j}$$

is:

$$\frac{\partial p_i}{\partial z_j} = \frac{\partial \frac{\exp^{z_i}}{\sum_{k=1}^{n} \exp^{z_k}}}{\partial z_j}$$

We know from the partial derivation rule in calculus that if $$f(x) = \frac{g(x)}{h(x)},$$

then:

$$f'(x) = \frac{g'(x)h(x) - h'(x)g(x)}{(h(x))^2}$$

In our case, $$g(x) = \exp^{z_i}, h(x) = \sum_{k=1}^{n} \exp^{z_k},$$

$$\frac{\partial h(x)}{\partial (\exp^{z_j})} = \frac{\partial \sum_{k=1}^{n} \exp^{z_k}}{\partial (\exp^{z_j})} = \exp^{z_j} \forall j, \text{ and}$$

$$\frac{\partial g(x)}{\partial (\exp^{z_j})} = \frac{\partial (\exp^{z_i})}{\partial (\exp^{z_j})} = (\exp^{z_j})$$

only when i=j.

We therefore have two situations to calculate the derivative.

First, when i=j:

$$\frac{\partial \frac{\exp^{z_i}}{\sum_{k=1}^{n} \exp^{z_k}}}{\partial z_j} = \frac{\exp^{z_i} \sum_{k=1}^{n} \exp^{z_k} - \exp^{z_j} \exp^{z_i}}{\left(\sum_{k=1}^{n} \exp^{z_k}\right)^2}$$

$$= \frac{\exp^{z_i}}{\sum_{k=1}^{n} \exp^{z_k}} \frac{\left(\sum_{k=1}^{n} \exp^{z_k}\right) - \exp^{z_j}}{\sum_{k=1}^{n} \exp^{z_k}}$$

$$= \frac{\exp^{z_j}}{\sum_{k=1}^{n} \exp^{z_k}} \frac{\left(\sum_{k=1}^{n} \exp^{z_k}\right) - \exp^{z_j}}{\sum_{k=1}^{n} \exp^{z_k}}$$

$$= p_i(1 - p_i)$$

Second, when i≠j:

$$\frac{\partial \frac{\exp^{z_i}}{\sum_{k=1}^{n} \exp^{z_k}}}{\partial z_j} = \frac{0 - \exp^{z_j} \exp^{z_i}}{\left(\sum_{k=1}^{n} \exp^{z_k}\right)^2}$$

$$= -\frac{\exp^{z_j}}{\sum_{k=1}^{n} \exp^{z_k}} \frac{\exp^{z_i}}{\sum_{k=1}^{n} \exp^{z_k}}$$

$$= -p_j p_i$$

To summarize above, the derivative of the softmax function is:

$$\frac{\partial p_i}{\partial z_j} = \begin{cases} p_i(1-p_j) & \text{if } i = j \\ -p_i p_j & \text{if } i \neq j \end{cases}$$

Decomposition of the Softmax Jacobian Matrix

In formulation 240 of FIG. 2B, the left-hand side (LHS) represents gradient loss elements $g_{xn}$ 202 for a function preceding the softmax function, and the right-hand side (RHS) represents an interaction between the softmax Jacobian matrix 204 and gradient loss elements $g_{pn}$ 206 of the softmax function.

Softmax Jacobian matrix 204 has a row for each of the normalized output elements $p_n$ of the softmax function, and a column for each of the unnormalized input elements $x_n$ to the softmax function.

In formulation 250, the entries of the softmax Jacobian matrix 204 are decomposed to take two forms: one for the diagonal entries 214 and one for the off-diagonal entries 216. The form of the off-diagonal entries 216 shows that the softmax Jacobian matrix 204 is a symmetric matrix in which each row is a gradient of one of the normalized output elements $p_n$ 222 of the softmax function with respect to each of the unnormalized input elements $x_n$ to the softmax function.

In formulation 260, the decomposed softmax Jacobian matrix 204 can be expressed as:

$$J_x(p) = \text{diag}(p) - p^T p$$

The first part represents an element-wise multiplication 232 between the normalized output elements $p_n$ 222 of the softmax function and the gradient loss elements $g_{pn}$ 206 of the softmax function. The second part (after the minus sign) represents a vector (outer) product between the normalized output elements $p_n$ 222 of the softmax function, the transpose $p_n^T$ 222T of the vector of the normalized output elements $p_n$ 222, and the gradient loss elements $g_{pn}$ 206.

The second part (after the minus sign) can be further decomposed into a first vector (outer) product $g_{pn}$ 224 between the normalized output elements $p_n$ 222 and the transpose $p_n^T$ 222T, and a second vector (inner) product 226 between the transpose $p_n^T$ 222T and the gradient loss elements $g_{pn}$ 206.

The second vector (inner) product 226 element-wise multiplies the gradient loss elements $g_{pn}$ 206 with the corresponding normalized output elements $p_n$ of the transpose $p_n^T$ 222T, and then sums the results of the element-wise multiplication to produce an accumulation C 234 (a scalar value).

Formulation 270 uses two multiplication operations. The first multiplication operation is the element-wise multiplication 232 between the normalized output elements $p_n$ 222 and the gradient loss elements $g_{pn}$ 206 (same as formulation 260). The second multiplication operation (after the minus sign) is a product between the normalized output elements $p_n$ 222 and the accumulation C 234 (a scalar value).

Compute Complexity Reduction

The technology disclosed proposes formulation 280, which reduces compute complexity, for the calculation of the softmax function's loss gradient backpropagation, from $O(n^2)$ to $O(n)$. This computational efficiency results because, unlike formulation 240 (which is a $O(n^2)$ operation because it comprises n dot products, each of length n), formulation 280 uses contains only 2n multiplies, one to compute the accumulation C 234 and another to compute the gradient loss elements $g_{xn}$ 202 for the function preceding the softmax function. This in turn improves hardware performance because multiplication consumes considerable hardware resources.

Formulation 280 has two parts. The first part is an element-wise subtraction 236 of the accumulation C 234 (a scalar value) from each of the gradient loss elements $g_{pn}$ 206. This produces modulated gradient loss elements $g_{pn'}$ 238 (FIG. 2C). The second part is an element-wise multiplication 242 between the modulated gradient loss elements $g_{pn'}$ 238 and the corresponding normalized output elements $p_n$ 222.

Computation Unit

FIG. 1 is a schematic diagram of a computation unit 100 that implements the disclosed computationally efficient way of calculating the softmax function's loss gradient backpropagation on hardware circuitry. The output of the computation unit 100 is the gradient loss elements $g_{xn}$ 202 for the function preceding the softmax function. The preceding function can be part of a layer that precedes the layer containing the softmax function.

In the example of FIG. 1, computation unit 100 comprises an input supplying the gradient loss elements $g_{pn}$ 206 of the softmax function and the normalized output elements $p_n$ 222 of the softmax function (or the transpose $p_n^T$ 222T).

A first circuit 110 is operatively coupled to the input and traverses the gradient loss elements $g_{pn}$ 206 and the normalized output elements $p_n$ 222 and produces the accumulation C 234.

A second circuit 120 is operatively coupled to the first circuit 110 and element-wise subtracts the accumulation C 234 from each of the gradient loss elements $g_{pn}$ 206 and produces the modulated gradient loss elements $g_{pn'}$ 238.

A third circuit 130 is operatively coupled to the second circuit 120 and traverses the modulated gradient loss elements $g_{pn'}$ 238 and produces the gradient loss elements $g_{xn}$ 202 for the function preceding the softmax function. The gradient loss elements $g_{xn}$ 202 are produced by element-wise multiplying the modulated gradient loss elements $g_{pn'}$ 238 with the corresponding normalized output elements $p_n$ 222.

Method

FIG. 3 describes a method 300 of calculating the softmax function's loss gradient backpropagation in the disclosed computationally efficient way.

At action 302, the method includes traversing, by the first circuit 110, the gradient loss elements $g_{pn}$ 206 of the softmax function and normalized output elements $p_n$ 222 of the softmax function and producing the accumulation C 234. The accumulation C 234 is produced by element-wise multiplying the gradient loss elements $g_{pn}$ 206 with the corresponding normalized output elements $p_n$ 222 and summing the results of the element-wise multiplication.

In one implementation, the method includes generating the Jacobian matrix 204 by determining a partial derivative of the normalized output elements $p_n$ 222 of the softmax function over the unnormalized input elements $x_n$ to the softmax function. In one implementation, the method includes decomposing the Jacobian matrix 204 into the diagonal entries 214 and the off-diagonal entries 216. In one implementation, the method includes further decomposing the off-diagonal entries 216 into the vector of the normalized output elements $p_n$ 222 and the transpose $p_n^T$ 222T of the vector of the normalized output elements $p_n$ 222. In one implementation, the method includes element-wise multiplying the gradient loss elements $g_{pn}$ 206 with the corresponding normalized output elements $p_n$ 222 of the transpose $p_n^T$ 222T. In one implementation, the method includes summing the results of the element-wise multiplication to produce the accumulation C 234.

At action 312, the method includes element-wise subtracting, by the second circuit 120, the accumulation C 234 from each of the gradient loss elements $g_{pn}$ 222 and producing the modulated gradient loss elements $g_{pn'}$ 238.

At action 322, the method includes traversing, by the third circuit 130, the modulated gradient loss elements $g_{pn'}$ 238 and producing the gradient loss elements $g_{xn}$ 202 for the function preceding the softmax function. The gradient loss elements $g_{xn}$ 202 are produced by element-wise multiplying the modulated gradient loss elements $g_{pn'}$ 238 with the corresponding normalized output elements $p_n$ 222.

In one implementation, the gradient loss elements $g_{pn}$ 222 of the softmax function are determined for a current classification module using backpropagation based on a loss function (e.g., mean squared error, cross entropy loss). In some implementations, the current classification module is part of a neural network (e.g., convolutional neural network, recurrent neural network). In one implementation, the neural network is a deep neural network (e.g., Inception, ResNet).

In one implementation, the number of multiplication operations required to produce the gradient loss elements $g_{xn}$ 202 of the function preceding the softmax function are reduced from $n^2$ to n, where n is the dimensionality of the gradient loss elements $g_{pn}$ 206 of the softmax function, the gradient loss elements $g_{xn}$ 202 of the function preceding the softmax function, the normalized output elements $p_n$ 222 of the softmax function, and the unnormalized input elements $x_n$ to the softmax function.

In one implementation, the first circuit 110 receives the gradient loss elements $g_{pn}$ 206 of the softmax function and the normalized output elements $p_n$ 222 of the softmax function in a first format and stores the accumulation C 234 in a second format, with the second format having more bits than the first format. In some implementations, the first format is Brain floating-point format 16 (bfloat16) and the second format is floating point 32 (FP32).

In one implementation, the second circuit 120 converts the gradient loss elements $g_{pn}$ 206 into the second format from the first format and produces the modulated gradient loss elements $g_{pn'}$ 238 in the second format.

In one implementation, the third circuit 130 converts the normalized output elements $p_n$ 222 into the second format from the first format and produces the gradient loss elements $g_{xn}$ 202 for the function preceding the softmax function in the second format. In some implementations, the third circuit 130 converts the gradient loss elements $g_{xn}$ 202 into the first format from the second format and makes them available in the first format for downstream processing.

Reconfigurable Processor

Figure 4:
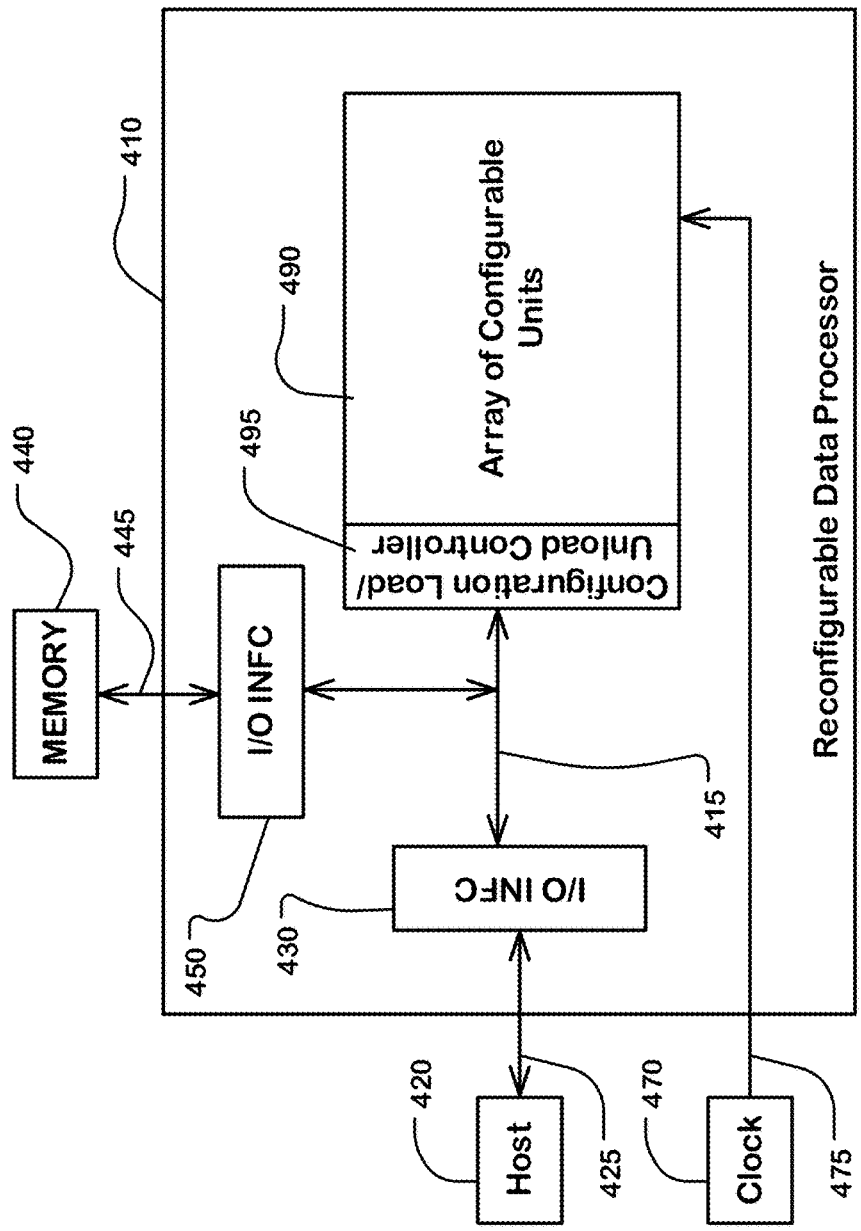
FIG. 4 is a system diagram illustrating a system including a host, a memory, and a reconfigurable data processor.

FIG. 4 is a diagram illustrating a system 400 including a host 420, a memory 440, and a reconfigurable data processor 410 in which a computation unit as described herein is deployed by hardware or by configuration of reconfigurable components. As shown in the example of FIG. 4, the reconfigurable data processor 410 includes an array 490 of configurable units and a configuration load/unload controller 495.

Figure 7:
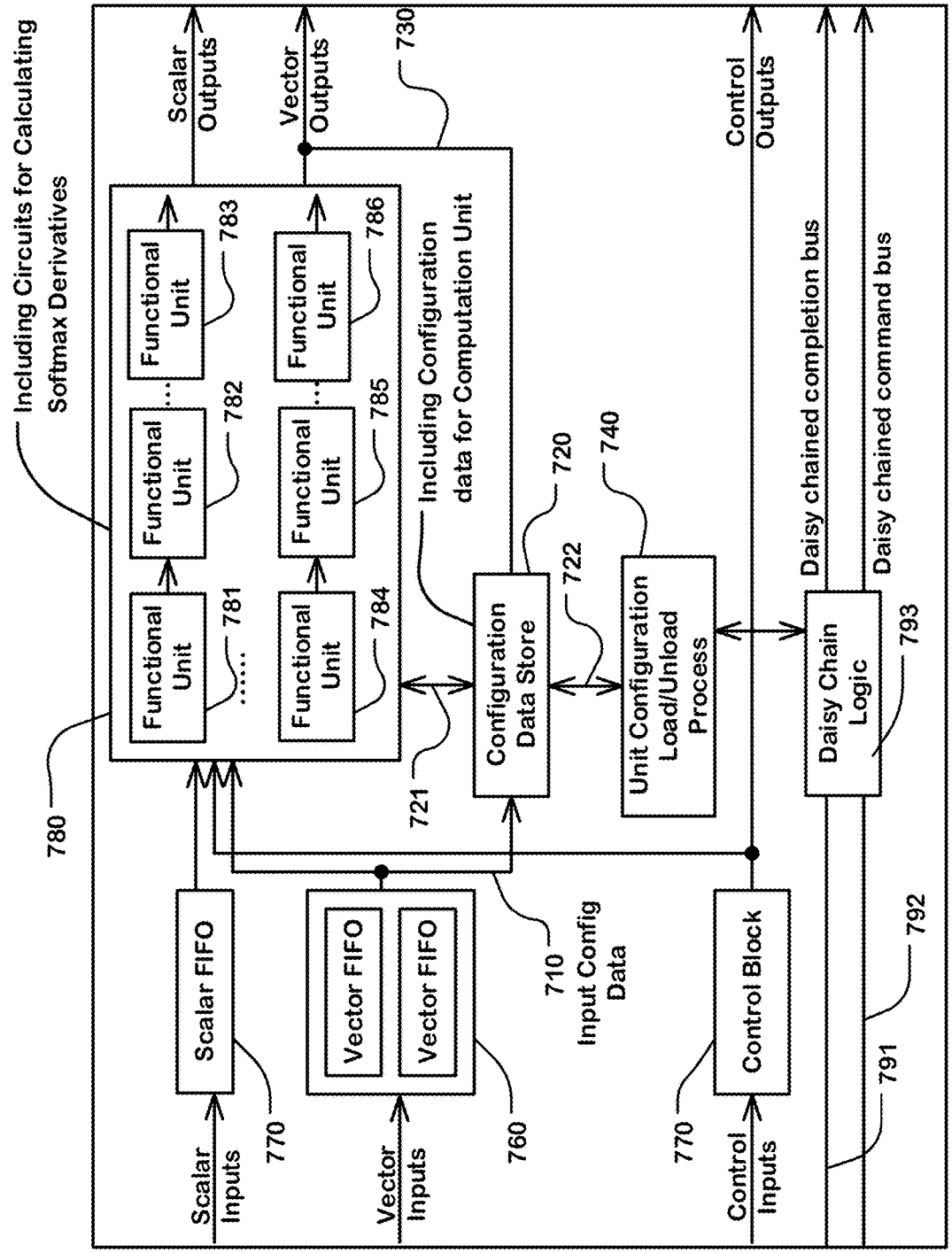
FIG. 7 is a block diagram illustrating an example configurable unit, such as a Pattern Compute Unit (PCU).
Figure 8:
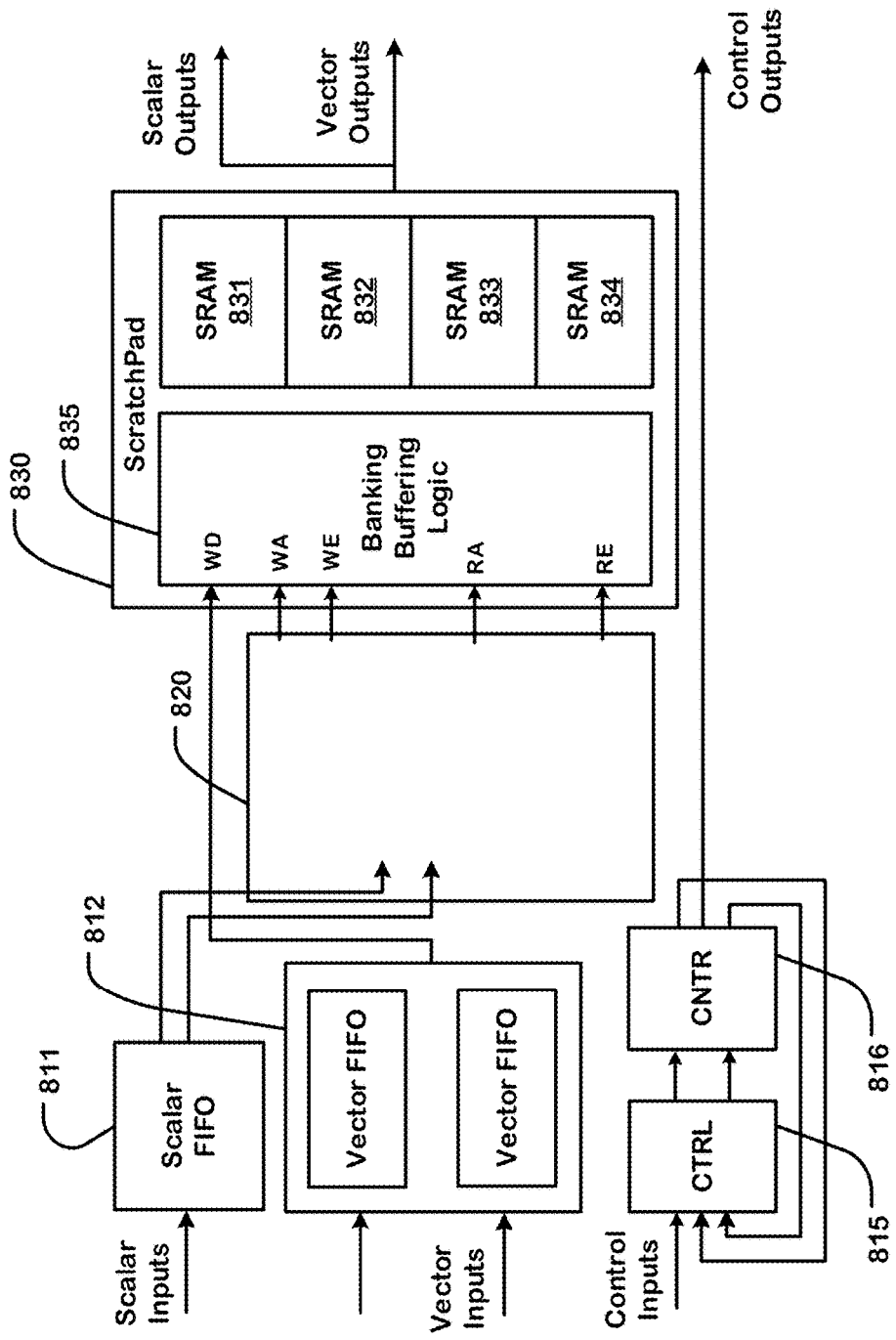
FIG. 8 is a block diagram illustrating an example configurable unit, such as a Pattern Memory Unit (PMU).

Configurable units in an array 490 of configurable units are further described in reference to FIGS. 7 and 8. Configurable units can include, or can have units configured to implement, a computation unit or computation units, as described herein.

The processor 410 includes an external I/O interface 430 connected to the host 420 by line 425, and an external I/O interface 450 connected to the memory 440 by line 445. The I/O interfaces 430, 450 connect via a bus system 415 to the array 490 of configurable units and to the configuration load/unload controller 495. The bus system 415 may have a bus width of carrying one chunk of data, which can be for this example 128 bits (references to 128 bits throughout can be considered as an example chunk size more generally).

To configure configurable units in the array 490 of configurable units with a configuration file, the host 420 can send the configuration file to the memory 440 via the interface 430, the bus system 415, and the interface 450 in the reconfigurable data processor 410. The configuration file can be loaded in many ways, as suits a particular architecture, including in data paths outside the configurable processor 410. The configuration file can be retrieved from the memory 440 via the memory interface 450. Chunks of the configuration file can then be sent in a distribution sequence to configurable units in the array 490 of configurable units in the reconfigurable data processor 410.

An external clock generator 470 or other clock line sources can provide a clock line 475 or clock lines to elements in the reconfigurable data processor 410, including the array 490 of configurable units, and the bus system 415, and the external data I/O interfaces. The bus system 415 can communicate data at a processor clock rate via a clock line 475 or clock lines.

Figure 5:
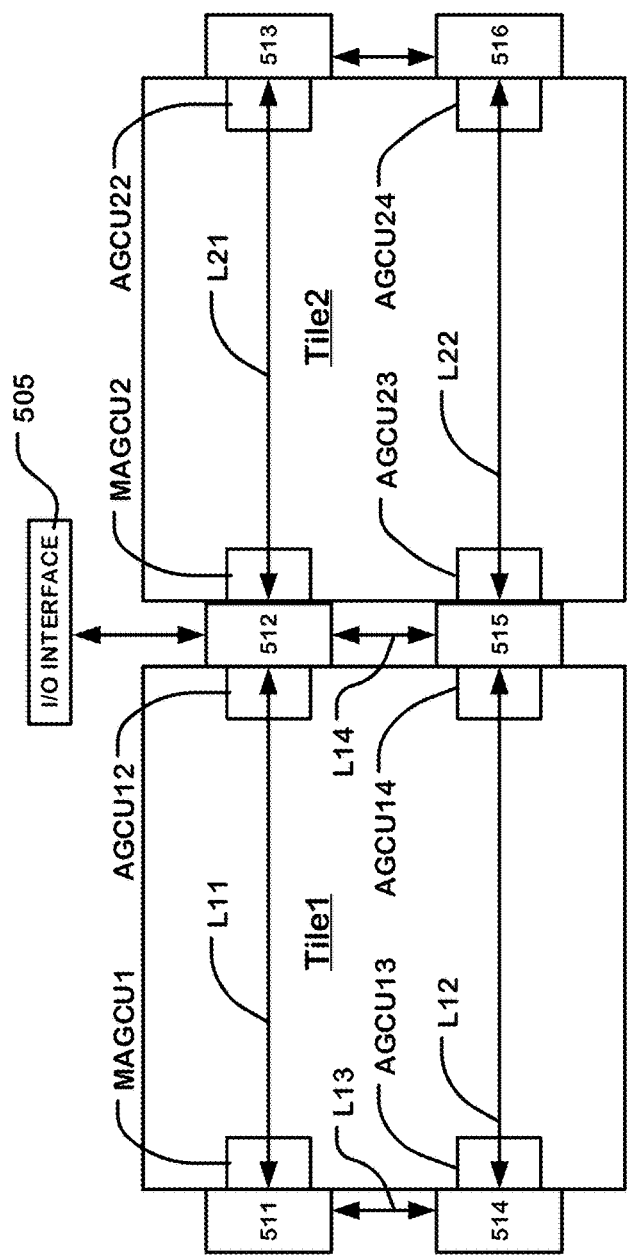
FIG. 5 is a simplified block diagram of a top-level network and components of a CGRA (Coarse Grain Reconfigurable Architecture).

FIG. 5 is a simplified block diagram of components of a CGRA (Coarse Grain Reconfigurable Architecture) processor. In this example, the CGRA processor has 2 tiles (Tile1, Tile2). The tile comprises an array of configurable units connected to a bus system, including array level networks in this example. An array of configurable units (e.g., 490, FIG. 4) in the tile includes computation units with input offsetting in hardware or by configuration of reconfigurable components. The bus system includes a top-level network connecting the tiles to external I/O interface 505 (or any number of interfaces). In other embodiments, different bus system configurations may be utilized. The configurable units in each tile are nodes on the array level network in this embodiment.

Each of the tiles has 4 AGCUs (Address Generation and Coalescing Units) (e.g., MAGCU1, AGCU12, AGCU13, AGCU14). The AGCUs are nodes on the top-level network and nodes on the array level networks and include resources for routing data among nodes on the top-level network and nodes on the array level network in each tile.

Nodes on the top-level network in this example include one or more external I/Os, including interface 505. The interfaces to external devices include resources for routing data among nodes on the top-level network and external devices, such as high-capacity memory, host processors, other CGRA processors, FPGA devices and so on, that are connected to the interfaces.

One of the AGCUs in a tile is configured in this example to be a master AGCU, which includes an array configuration load/unload controller for the tile. In other embodiments, more than one array configuration load/unload controller can be implemented, and one array configuration load/unload controller may be implemented by logic distributed among more than one AGCU.

The MAGCU1 includes a configuration load/unload controller for Tile1, and MAGCU2 includes a configuration load/unload controller for Tile2. In other embodiments, a configuration load/unload controller can be designed for loading and unloading configuration of more than one tile. In other embodiments, more than one configuration controller can be designed for configuration of a single tile. Also, the configuration load/unload controller can be implemented in other portions of the system, including as a stand-alone node on the top-level network and the array level network or networks.

The top-level network is constructed using top-level switches (511-516) connecting to each other as well as to other nodes on the top-level network, including the AGCUs, and I/O interface 505. The top-level network includes links (e.g., L11, L12, L21, L22) connecting the top-level switches. Data travels in packets between the top-level switches on the links, and from the switches to the nodes on the network connected to the switches. For example, top-level switches 511 and 512 are connected by a link L11, top-level switches 514 and 515 are connected by a link L12, top-level switches 511 and 514 are connected by a link L13, and top-level switches 512 and 513 are connected by a link L21. The links can include one or more buses and supporting control lines, including for example a chunk-wide bus (vector bus). For example, the top-level network can include data, request and response channels operable in coordination for transfer of data in a manner analogous to an AXI compatible protocol. See, AMBA® AXI and ACE Protocol Specification, ARM, 2017.

Top-level switches can be connected to AGCUs. For example, top-level switches 511, 512, 514, and 515 are connected to MAGCU1, AGCU12, AGCU13 and AGCU14 in the tile Tile1, respectively. Top-level switches 512, 513, 515, and 516 are connected to MAGCU2, AGCU22, AGCU23 and AGCU24 in the tile Tile2, respectively.

Top-level switches can be connected to one or more external I/O interfaces (e.g., interface 505).

Figure 6B:
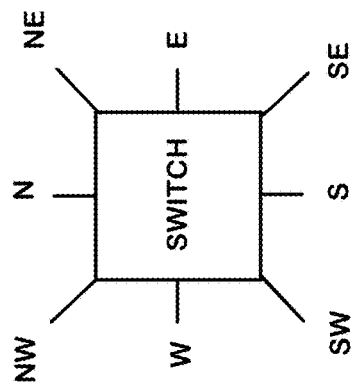
FIG. 6B illustrates an example switch unit connecting elements in an array level network.
Figure 6A:
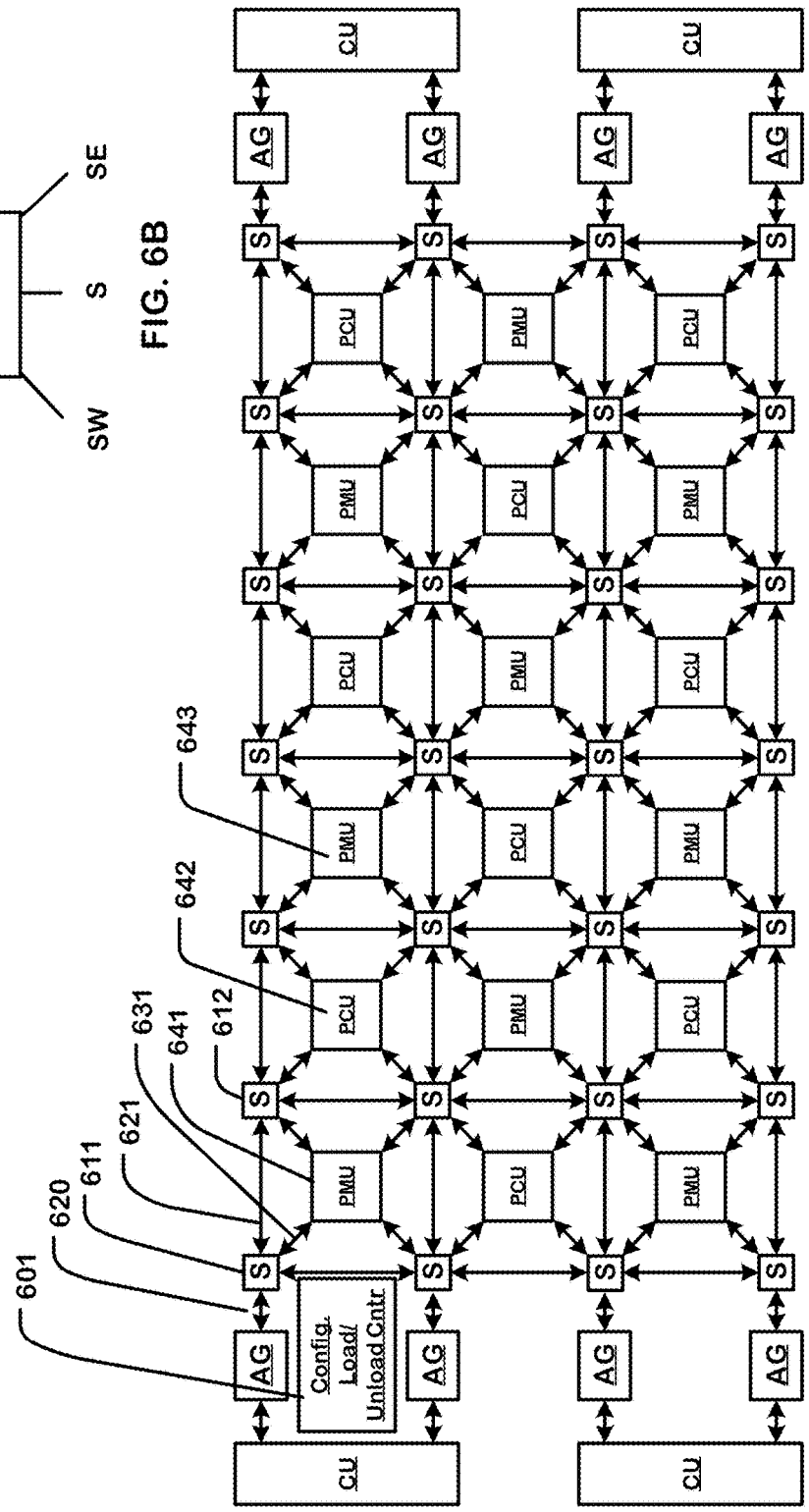
FIG. 6A is a simplified diagram of a tile and an array level network usable in the configuration of FIG. 4, where the configurable units are nodes on the array level network and are configurable to implement a lookup table with input offsetting.

FIG. 6A is a simplified diagram of a tile and an array level network usable in the configuration of FIG. 5, where the configurable units in the array are nodes on the array level network and are configurable to implement a lookup table with input offsetting.

Figure 9:
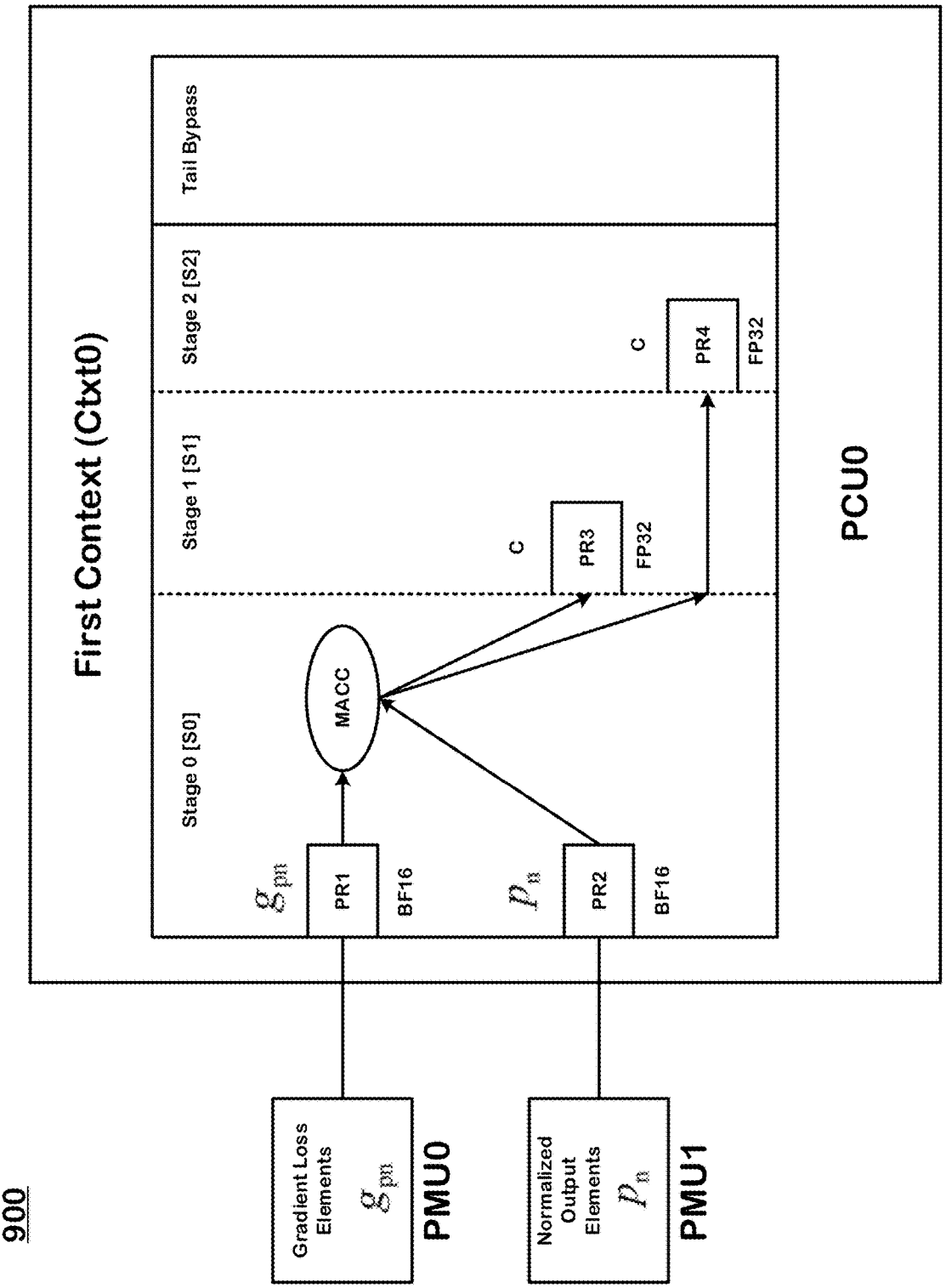
FIGS. 9 and 10 illustrate example implementation of a computation unit configuration of configurable units in an array of configurable units in a reconfigurable data processor, like that represented by FIGS. 4-8.
Figure 10:
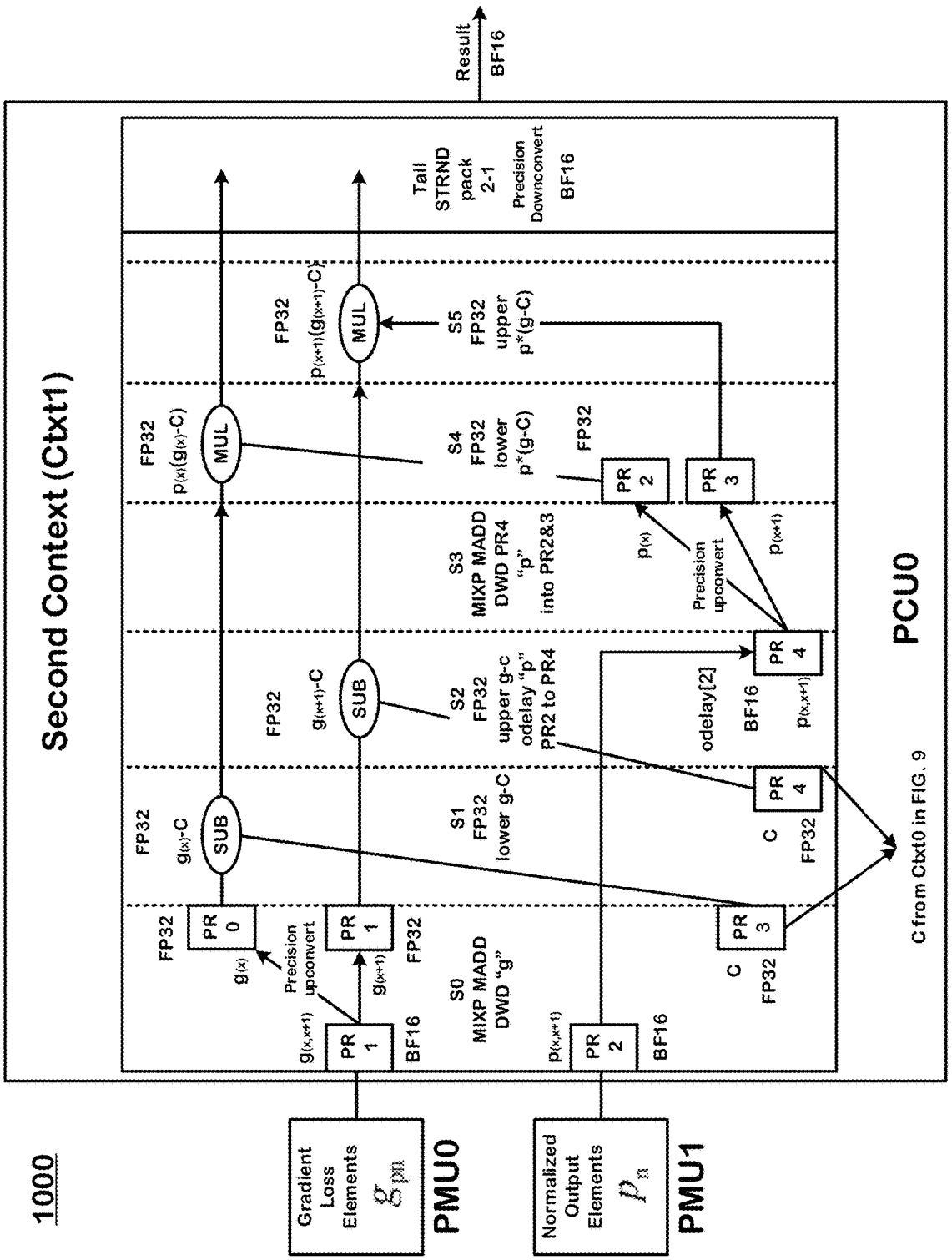

In this example, the array of configurable units 600 includes a plurality of types of configurable units. The types of configurable units in this example, include Pattern Compute Units (PCU), Pattern Memory Units (PMU), switch units (S), and Address Generation and Coalescing Units (each including two address generators AG and a shared CU). For an example of the functions of these types of configurable units, see, Prabhakar et al., "Plasticine: A Reconfigurable Architecture For Parallel Patterns", ISCA '17, Jun. 24-28, 2017, Toronto, ON, Canada, which is incorporated by reference as if fully set forth herein. In this example, the PCUs (e.g., 642) and PMUs (e.g., 643) in the array of configurable units 600 can include resources configurable for implementation of a computation unit, an example configuration of which is described herein (FIGS. 9 and 10). Each of these configurable units contains a configuration store comprising a set of registers or flip-flops that represent either the setup or the sequence to run a program, and can include the number of nested loops, the limits of each loop iterator, the routes and/or instructions to be executed for each stage including stages, the source of the operands, and the network parameters for the input and output interfaces. The configuration file can include entries of lookup tables as described herein.

Additionally, each of these configurable units contains a configuration store comprising a set of registers or flip-flops that store status usable to track progress in nested loops or otherwise. A configuration file in the configuration store contains a bit-stream representing the initial configuration, or starting state, of each of the components that execute the program. This bit-stream is referred to as a bit file. Program load is the process of setting up the configuration stores in the array of configurable units based on the contents of the bit file to allow the components to execute a program (i.e., a machine), including programs that utilize the lookup table with input offsetting. Program Load may also require the load of all PMU memories.

The array level network includes links interconnecting configurable units in the array. The links in the array level network include one or more and, in this case, three kinds of physical buses: a chunk-level vector bus (e.g., 128 bits of data), a word-level scalar bus (e.g., 32 bits of data), and a multiple bit-level control bus. For instance, interconnect 621 between switch units 611 and 612 includes a vector bus interconnect with a vector bus width of 128 bits, a scalar bus interconnect with a scalar bus width of 32 bits, and a control bus interconnect.

The three kinds of physical buses differ in the granularity of data being transferred. In one embodiment, the vector bus can carry a chunk that includes 16-Bytes (=128 bits) of data as its payload. The scalar bus can have a 32-bit payload and carry scalar operands or control information. In some machines implemented using this system, data can be represented using floating point data formats, including standard or non-standard formats. Example formats include FP32 and BF16, among others. It can be understood that the number of data values carried on the scalar and vector buses is a function of the encoding format of the data values, with FP32 utilizing 32 bits per value and BF16 using 16 bits per value.

The control bus can carry control handshakes such as tokens and other lines. The vector and scalar buses can be packet switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., North, South, East, West, etc.) used to reach the destination unit. The control network can be circuit switched based on timing circuits in the device, for example. The configuration load/unload controller can generate a header for each chunk of configuration data of 128 bits. The header is transmitted on a header bus to each configurable unit in the array of configurable unit.

In one example, a chunk of data of 128 bits is transmitted on the vector bus that provides the chunk as vector inputs to a configurable unit. The vector bus can include 128 payload lines, and a set of header lines. The header can include a sequence ID for each chunk, which can include:

A bit to indicate if the chunk is scratchpad memory or configuration store data.
Bits that form a chunk number.
Bits that indicate a column identifier.
Bits that indicate a row identifier.
Bits that indicate a component identifier.

For a load operation, the configuration load controller can send the number N of chunks to a configurable unit in order from N−1 to 0. For this example, the 6 chunks are sent out in most-significant-bit-first order of Chunk 5→Chunk 4→Chunk 3→Chunk 2→Chunk 1→Chunk 0. (Note that this most-significant-bit-first order results in Chunk 5 being distributed in round 0 of the distribution sequence from the array configuration load controller.) For an unload operation, the configuration unload controller can write out the unload data of order to the memory. For both load and unload operations, the shifting in the configuration serial chains in a configuration data store in a configurable unit is from LSB (least-significant-bit) to MSB (most-significant-bit), or MSB out first.

FIG. 6B illustrates an example switch unit connecting elements in an array level network. As shown in the example of FIG. 6B, a switch unit can have 8 interfaces. The North, South, East and West interfaces of a switch unit are used for connections between switch units. The Northeast, Southeast, Northwest and Southwest interfaces of a switch unit are each used to make connections to PCU or PMU instances. A set of 2 switch units in each tile quadrant have connections to an Address Generation and Coalescing Unit (AGCU) that include multiple address generation (AG) units and a coalescing unit (CU) connected to the multiple address generation units. The coalescing unit (CU) arbitrates between the AGs and processes memory requests. Each of the 8 interfaces of a switch unit can include a vector interface, a scalar interface, and a control interface to communicate with the vector network, the scalar network, and the control network.

During execution of a machine after configuration, data can be sent via one or more unit switches and one or more links between the unit switches to the configurable units using the vector bus and vector interface(s) of the one or more switch units on the array level network.

In embodiments described herein, a configuration file or bit file, before configuration of the tile, can be sent from the configuration load controller using the same vector bus, via one or more unit switches and one or more links between the unit switches to the configurable unit using the vector bus and vector interface(s) of the one or more switch units on the array level network. For instance, a chunk of configuration data in a unit file particular to a configurable unit PMU 641 can be sent from the configuration load/unload controller 601 to the PMU 641, via a link 620 between the configuration load/unload controller 601 and the West (W) vector interface of the switch unit 611, the switch unit 611, and a link 631 between the Southeast (SE) vector interface of the switch unit 611 and the PMU 641.

In this example, one of the AGCUs is configured to be a master AGCU, which includes a configuration load/unload controller (e.g., 601). The master AGCU implements a register through which the host (420, FIG. 4) can send commands via the bus system to the master AGCU. The master AGCU controls operations on an array of configurable units in a tile and implements a program control state machine to track the state of the tile based on the commands it receives from the host through writes to the register. For every state transition, the master AGCU issues commands to all components on the tile over a daisy-chained command bus (FIG. 4). The commands include a program reset command to reset configurable units in an array of configurable units in a tile, and a program load command to load a configuration file to the configurable units.

The configuration load controller in the master AGCU is responsible for reading the configuration file from the memory and sending the configuration data to every configurable unit of the tile. The master AGCU can read the configuration file from the memory at preferably the maximum throughput of the top-level network. The data read from memory are transmitted by the master AGCU over the vector interface on the array level network to the corresponding configurable unit according to a distribution sequence described herein.

In one embodiment, in a way that can reduce the wiring requirements within a configurable unit, configuration and status registers holding unit files to be loaded in a configuration load process, or unloaded in a configuration unload process, in a component are connected in a serial chain and can be loaded through a process of shifting bits through the serial chain. In some embodiments, there may be more than one serial chain arranged in parallel or in series. When a configurable unit receives the for example 128 bits of configuration data from the master AGCU in one bus cycle, the configurable unit shifts this data through its serial chain at the rate of 1 bit per cycle, where shifter cycles can run at the same rate as the bus cycle. It will take 128 shifter cycles for a configurable unit to load 128 configuration bits with the 128 bits of data received over the vector interface. The 128 bits of configuration data are referred to as a chunk. A configurable unit can require multiple chunks of data to load all its configuration bits.

The configurable units interface with the memory through multiple memory interfaces (450, FIG. 4). Each of the memory interfaces can be accessed using several AGCUs. Each AGCU contains a reconfigurable scalar data path to generate requests for the off-chip memory. Each AGCU contains FIFOs (first-in-first-out buffers for organizing data) to buffer outgoing commands, data, and incoming responses from the off-chip memory.

FIG. 7 is a block diagram illustrating an example configurable unit 700, such as a Pattern Compute Unit (PCU). A configurable unit can interface with the scalar, vector, and control buses, in this example using three corresponding sets of inputs and outputs (IO): scalar inputs/outputs, vector inputs/outputs, and control inputs/outputs. Scalar IOs can be used to communicate single words of data (e.g., 32 bits). Vector IOs can be used to communicate chunks of data (e.g., 128 bits), in cases such as receiving configuration data in a unit configuration load process, and transmitting and receiving data during operation after configuration across a long pipeline between multiple PCUs. Control IOs can be used to communicate signals on control lines such as the start or end of execution of a configurable unit. Control inputs are received by control block 770, and control outputs are provided by the control block 770.

Each vector input is buffered in this example using a vector FIFO in a vector FIFO block 760 which can include one or more vector FIFOs. Likewise in this example, each scalar input is buffered using a scalar FIFO 750. Using input FIFOs decouples timing between data producers and consumers, and simplifies inter-configurable-unit control logic by making it robust to input delay mismatches.

A configurable unit includes multiple reconfigurable data paths in block 780. A data path in a configurable unit can be organized as a multi-stage (Stage 1 . . . Stage N), reconfigurable SIMD (Single Instruction, Multiple Data) pipeline. The chunks of data pushed into the configuration serial chain in a configurable unit include configuration data for each stage of each data path in the configurable unit. The configuration serial chain in the configuration data store 720 is connected to the multiple data paths in block 780 via lines 721.

A configurable data path organized as a multi-stage pipeline can include multiple functional units (e.g., 781, 782, 783, 784, 785, 786) at respective stages. A computation unit or parts of a computation unit can be implemented in multiple functional units at respective stages in a multi-stage pipeline or in multiple multi-stage pipelines, as described in FIG. 8. In the example as shown in FIG. 8, a circuit including a lookup table with input offsetting can be implemented in multiple functional units and multiple memory units. Input registers in functional units can register inputs from scalar FIFOs 750 or Vector FIFOs 760 or from previous stages in a multi-stage pipeline. A functional unit at a stage in a multi-stage pipeline can execute a function, e.g., logical shift, an arithmetic function, comparison, a logical operation, etc., and generate an output.

Configurable units in the array of configurable units include configuration data stores 720 (e.g., serial chains) to store unit files comprising a plurality of chunks (or sub-files of other sizes) of configuration data particular to the corresponding configurable units. Configurable units in the array of configurable units each include unit configuration load logic 740 connected to the configuration data store 720 via line 722, to execute a unit configuration load process. The unit configuration load process includes receiving, via the bus system (e.g., the vector inputs), chunks of a unit file particular to the configurable unit, and loading the received chunks into the configuration data store 720 of the configurable unit. The unit file loaded into the configuration data store 720 can include configuration data, including opcodes and routing configuration, for circuits (e.g., module) implementing a lookup table with input offsetting in multiple functional units and multiple memory units, as described herein.

The configuration data stores in configurable units in the plurality of configurable units in this example comprise serial chains of latches, where the latches store bits that control configuration of the resources in the configurable unit. A serial chain in a configuration data store can include a shift register chain for configuration data and a second shift register chain for state information and counter values connected in series.

Input configuration data 710 can be provided to a vector FIFO as vector inputs, and then be transferred to the configuration data store 720. Output configuration data 730 can be unloaded from the configuration data store 720 using the vector outputs.

The CGRA uses a daisy-chained completion bus to indicate when a load/unload command has been completed. The master AGCU transmits the program load and unload commands to configurable units in the array of configurable units over a daisy-chained command bus. As shown in the example of FIG. 7, a daisy-chained completion bus 791 and a daisy-chained command bus 792 are connected to daisy-chain logic 793, which communicates with the unit configuration load logic 740. The daisy-chain logic 793 can include load complete status logic, as described below. The daisy-chained completion bus is further described below. Other topologies for the command and completion buses are clearly possible but not described here.

FIG. 8 is a block diagram illustrating an example configurable unit 800, such as a Pattern Memory Unit (PMU). A PMU can contain scratchpad memory 830 coupled with a reconfigurable scalar data path 820 intended for address calculation (RA, WA) and control (WE, RE) of the scratchpad memory 830, along with the bus interfaces used in the PCU (FIG. 7).

The bus interfaces can include scalar inputs, vector inputs, scalar outputs and vector outputs, usable to provide write data WD. The data path can be organized as a multi-stage reconfigurable pipeline, including stages of functional units FUs and associated pipeline registers PRs that register inputs and outputs of the functional units. PMUs can be used to store distributed on-chip memory throughout the array of reconfigurable units.

A scratchpad is built with multiple SRAM banks (e.g., 831-834). Banking and buffering logic 835 for the SRAM banks in the scratchpad can be configured to operate in several banking modes to support various access patterns. A computation unit as described herein can include a lookup table stored in the scratchpad memory 830, from a configuration file or from other sources. In a computation unit as described herein, the scalar data path 820 can translate a section of a raw input value I for addressing lookup tables implementing a function f(I), into the addressing format utilized by the SRAM scratchpad memory 830, adding appropriate offsets and so on, to read the entries of the lookup table stored in the scratchpad memory 830 using the sections of the input value I. Each PMU can include write address calculation logic and read address calculation logic that provide write address WA, write enable WE, read address RA and read enable RE to the banking buffering logic 835. Based on the state of the local FIFOs 811 and 812 and external control inputs, the control block 815 can be configured to trigger the write address computation, read address computation, or both, by enabling the appropriate counters 816. A programmable counter chain (Control Inputs, Control Outputs) and control block 815 can trigger PMU execution.

FIGS. 9 and 10 illustrate example implementation of a computation unit configuration of configurable units in an array of configurable units in a reconfigurable data processor, like that represented by FIGS. 4-8. Thus, in a reconfigurable data processor, in an array of configurable units connected to a bus system, configurable units in the array include configuration data stores to store configuration data that establishes data flow and execution parameters for a machine. The machine can include a computation unit formed at least in part using the configurable resources in the array as illustrated in FIGS. 9 and 10. As discussed above, the configurable units in the array can include execution units, configurable using a configuration file to execute a number of functions. In some embodiments, the configuration file can provide an opcode to specify the function to be executed, and the constant which can be used as immediate data in the execution of the function. In some embodiments, the opcode and immediate data can be provided from other sources.

FIG. 9 shows operation of two PMUs and one PCU in a first context (Ctxt0) for generation of the accumulation C 234. PMU0 comprises the gradient loss elements $g_{pn}$ 206 of the softmax function. PMU1 comprises the normalized output elements $p_n$ 222 of the softmax function. On an element-by-element basis, the gradient loss elements $g_{pn}$ 206 are loaded onto the header pipeline register 1 (PR1) of the PCU0. Similarly, on an element-by-element basis, the normalized output elements $p_n$ 222 are loaded onto the header pipeline register 2 (PR2) of the PCU0. In some implementations, the element-by-element processing happens in parallel for all the elements of the gradient loss elements $g_{pn}$ 206 and the normalized output elements $p_n$ 222 by operating the PMUs and the PCU across multiple lanes.

In one implementation, the gradient loss elements $g_{pn}$ 206 and the normalized output elements $p_n$ 222 are in the BF16 format. Then, the accumulation C 234 is produced by element-wise multiplying the gradient loss elements $g_{pn}$ 206 with the corresponding normalized output elements $p_n$ 222 and summing the results of the element-wise multiplication. This is achieved by the multiplication and accumulation (MACC) operation. In one implementation, two copies of the accumulation C 234 are respectively stored in the pipeline register 3 (PR3) and the pipeline register 4 (PR4) in the FP32 format. Conversion from the BF16 format to the FP32 format is done to improve arithmetic accuracy, details of which can be found in the U.S. application Ser. No. 16/590,058 (SBNV 1011-1), Ser. No. 16/695,138 (SBNV 1012-1), Ser. No. 16/688,069 (SBNV 1013-1), and Ser. No. 16/718,094 (SBNV 1014-1). The "tail bypass" status denotes that the accumulation C 234 is not transmitted outside the PCU0 and used in a subsequent context of the PCU0. This conversion from the BF16 format to the FP32 format can be referred to as the "precision upconvert" operation.

FIG. 10 shows operation of the two PMUs and the one PCU from FIG. 9 in a second context (Ctxt1) for generation of the modulated gradient loss elements $g_{pn'}$ 238 and the gradient loss elements $g_{xn}$ 202 for the function preceding the softmax function.

The modulated gradient loss elements $g_{pn'}$ 238 are produced by element-wise subtracting the accumulation C 234 from each of the corresponding gradient loss elements $g_{pn}$ 206.

In the example shown in FIG. 10, only two elements among the modulated gradient loss elements $g_{pn'}$ 238 are produced by element-wise subtracting the accumulation C 234 from corresponding two elements among the gradient loss elements $g_{pn}$ 206. The element-wise subtraction is depicted in FIG. 10 as $g_{(x)}$–C for the first (or current) element and as $g_{(x+1)}$–C for the second (or subsequent/succeeding) element. In some implementations, all the elements of the modulated gradient loss elements $g_{pn'}$ 238 are produced in parallel by operating the PMUs and the PCU across multiple lanes.

PMU0 comprises the gradient loss elements $g_{pn}$ 206 of the softmax function. PMU1 comprises the normalized output elements $p_n$ 222 of the softmax function. On an element-by-element basis, the gradient loss elements $g_{pn}$ 206 are loaded onto the header pipeline register 1 (PR1) of the PCU0. Similarly, on an element-by-element basis, the normalized output elements $p_n$ 222 are loaded onto the header pipeline register 2 (PR2) of the PCU0. In some implementations, the element-by-element processing happens in parallel for all the elements of the gradient loss elements $g_{pn}$ 206 and the normalized output elements $p_n$ 222 by operating the PMUs and the PCU across multiple lanes.

In one implementation, the gradient loss elements $g_{pn}$ 206 in the BF16 format. In one implementation, PR1 is a 32-bit register and therefore contains two elements $g_{(x)}$ and $g_{(x+1)}$ of the gradient loss elements $g_{pn}$ 206 in the BF16 format. Then, the two elements $g_{(x)}$ and $g_{(x+1)}$ of the gradient loss elements $g_{pn}$ 206 are converted from the BF16 format to the FP32 format using precision upconvert and are respectively stored in the pipeline registers (PR0) and (PR1) in the FP32 format. This occurs at stage zero (S0) of the PCU0.

At stage one (S1) of the PCU0, the element-wise subtraction $g_{(x)}-C$ occurs for the first (or current) element of the gradient loss elements $g_{pn}$ 206. For the subtraction operation, the accumulation C 234 is retrieved from the pipeline register PR3 in the FP32 format (FIG. 9). The output of this subtraction operation is the first (or current) corresponding element of the modulated gradient loss elements $g_{pn'}$ 238, which is transmitted to stage four (S4) for calculation of the first (or current) corresponding element of the gradient loss elements $g_{xn}$ 202 for the function preceding the softmax function.

At stage two (S2) of the PCU0, the element-wise subtraction $g_{(x+1)}-C$ occurs for the second (or subsequent/succeeding) element of the gradient loss elements $g_{pn}$ 206. For the subtraction operation, the accumulation C 234 is retrieved from the pipeline register PR4 in the FP32 format (FIG. 9). The output of this subtraction operation is the second (or subsequent/succeeding) corresponding element of the modulated gradient loss elements $g_{pn'}$ 238, which is transmitted to stage five (S5) for calculation of the first corresponding element of the gradient loss elements $g_{xn}$ 202 for the function preceding the softmax function.

The gradient loss elements $g_{xn}$ 202 are produced by element-wise multiplying the modulated gradient loss elements $g_{pn'}$ 238 with the corresponding normalized output elements $p_n$ 222.

In one implementation, the normalized output elements $p_n$ 222 are in the BF16 format. In one implementation, PR2 is a 32-bit register and therefore contains two elements $p_{(x)}$ and $p_{(x+1)}$ of the normalized output elements $p_n$ 222 in the BF16 format. Then, the two elements $p_{(x)}$ and $p_{(x+1)}$ of the normalized output elements $p_n$ 222 are converted from the BF16 format to the FP32 format using precision upconvert and are respectively stored in the pipeline registers (PR2) and (PR3) in the FP32 format. This occurs at stage three (S3) of the PCU0. In one implementation, prior to the precision upconvert, the two elements $p_{(x)}$ and $p_{(x+1)}$ of the normalized output elements $p_n$ 222 are transmitted to stage two (S2) of the PCU0 and stored in the pipeline register (PR4) in the BF16 format because PR4 can also be a 32-bit register.

At stage four (S4) of the PCU0, the element-wise multiplication $p_{(x)}(g_{(x)}-C)$ occurs between the first (or current) element of the normalized output elements $p_n$ 222 and the first (or current) corresponding element of the modulated gradient loss elements $g_{pn'}$ 238 to produce the first (or current) corresponding element of the gradient loss elements $g_{xn}$ 202 for the function preceding the softmax function in the FP32 format, which is transmitted to the tail STRND for precision downconvert to the BF16 format as the result exiting the PCU0 as output. The first (or current) corresponding element of the gradient loss elements $g_{xn}$ 202 exits the PCU0 as the output result in the BF16 format for downstream processings.

At stage five (S5) of the PCU0, the element-wise multiplication $p_{(x+1)}(g_{(x+1)}-C)$ occurs between the second (or subsequent/succeeding) element of the normalized output elements $p_n$ 222 and the second (or subsequent/succeeding) corresponding element of the modulated gradient loss elements $g_{pn'}$ 238 to produce the second (or subsequent/succeeding) corresponding element of the gradient loss elements $g_{xn}$ 202 for the function preceding the softmax function in the FP32 format, which is transmitted to the tail STRND for precision downconvert to the BF16 format. The second (or subsequent/succeeding) corresponding element of the gradient loss elements $g_{xn}$ 202 exits the PCU0 as the output result in the BF16 format for downstream processing.

This is one simplified example of a configuration of a configurable processor for implementing a computation unit as described herein. The configurable processor can be configured in other ways to implement a computation unit. Other types of configurable processors can implement the computation unit in other ways. Also, the computation unit can be implemented using dedicated logic in some examples, or a combination of dedicated logic and instruction-controlled processors.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A computation unit, comprising:
a first circuit to traverse gradient loss elements $g_{pn}$ of a softmax function and normalized output elements $p_n$ of the softmax function and produce an accumulation C, wherein the accumulation C is produced by element-wise multiplying the gradient loss elements $g_{pn}$ with the corresponding normalized output elements $p_n$ and summing the results of the element-wise multiplication;
a second circuit operatively coupled to the first circuit to element-wise subtract the accumulation C from each of the gradient loss elements $g_{pn}$ and produce modulated gradient loss elements $g_{pn'}$; and
a third circuit operatively coupled to the second circuit to traverse the modulated gradient loss elements $g_{pn'}$ and produce gradient loss elements $g_{xn}$ for a function preceding the softmax function, wherein the gradient loss elements $g_{xn}$ are produced by element-wise multiplying the modulated gradient loss elements $g_{pn'}$ with the corresponding normalized output elements $p_n$,
wherein the first, second, and third circuits comprise a set of one or more computation units,
wherein at least one of the computation units comprises a multi-lane, multi-stage computation pipeline,
wherein the gradient loss elements $g_{pn}$ are converted from a first data format to a second data format using precision upconvert,
wherein, at first and second stages of the multi-lane, multi-stage computation pipeline, the accumulation C is element-wise subtracted in the second data format from corresponding ones of the gradient loss elements $g_{pn}$ to produce corresponding ones of the modulated gradient loss elements $g_{pn'}$ in the second data format,
wherein, at a third stage of the multi-lane, multi-stage computation pipeline, the normalized output elements $p_n$ are converted from the first data format to the second data format using precision upconvert,
wherein, at fourth and fifth stages of the multi-lane, multi-stage computation pipeline, corresponding ones of the normalized output elements $p_n$ are element-wise multiplied in the second data format with corresponding ones of the modulated gradient loss elements $g_{pn'}$ to produce corresponding ones of the gradient loss elements $g_{xn}$ in the second data format, and
wherein the corresponding ones of the gradient loss elements $g_{xn}$ are converted from the second data format to the first data format using precision downconvert.

2. The computation unit of claim 1, further configured to:
generate a Jacobian matrix by determining a partial derivative of the normalized output elements $p_n$ of the softmax function over unnormalized input elements $x_n$ to the softmax function;
decompose the Jacobian matrix into diagonal entries and off-diagonal entries;
further decompose the off-diagonal entries into a vector of the normalized output elements $p_n$ and a transpose $p_n^T$ of the vector of the normalized output elements $p_n$;
element-wise multiply the gradient loss elements $g_{pn}$ with the corresponding normalized output elements $p_n$ of the transpose $p_n^T$; and
sum the results of the element-wise multiplication to produce the accumulation C.

3. The computation unit of claim 1, wherein the gradient loss elements $g_{pn}$ of the softmax function are determined for a current classification module using backpropagation based on a loss function.

4. The computation unit of claim 3, wherein the current classification module is part of a neural network.

5. The computation unit of claim 4, wherein the neural network is a deep neural network.

6. The computation unit of claim 1, wherein the number of multiplication operations required to produce the gradient loss elements $g_{xn}$ of the function preceding the softmax function are reduced from $n^2$ to n, where n is the dimensionality of the gradient loss elements $g_{pn}$ of the softmax function, the gradient loss elements $g_{xn}$ of the function preceding the softmax function, the normalized output elements $p_n$ of the softmax function, and the unnormalized input elements $x_n$ to the softmax function.

7. The computation unit of claim 1, wherein the first circuit receives the gradient loss elements $g_{pn}$ of the softmax function and the normalized output elements $p_n$ of the softmax function in a first format and stores the accumulation C in a second format, with the second format having more bits than the first format.

8. The computation unit of claim 7, wherein the first format is Brain floating-point format 16 (bfloat16) and the second format is floating point 32 (FP32).

9. The computation unit of claim 8, wherein the second circuit converts the gradient loss elements $g_{pn}$ into the second format from the first format and produces the modulated gradient loss elements $g_{pn'}$ in the second format.

10. The computation unit of claim 9, wherein the third circuit converts the normalized output elements $p_n$ into the second format from the first format and produces the gradient loss elements $g_{xn}$ for the function preceding the softmax function in the second format.

11. The computation unit of claim 10, wherein the third circuit converts the gradient loss elements $g_{xn}$ into the first format from the second format and makes them available in the first format for downstream processing.

12. A re-configurable processor, comprising:
a first circuit to traverse gradient loss elements $g_{pn}$ of a softmax function and normalized output elements $p_n$ of the softmax function and produce an accumulation C, wherein the accumulation C is produced by element-wise multiplying the gradient loss elements $g_{pn}$ with the corresponding normalized output elements $p_n$ and summing the results of the element-wise multiplication;
a second circuit operatively coupled to the first circuit to element-wise subtract the accumulation C from each of the gradient loss elements $g_{pn}$ and produce modulated gradient loss elements $g_{pn'}$; and
a third circuit operatively coupled to the second circuit to traverse the modulated gradient loss elements $g_{pn'}$ and produce gradient loss elements $g_{xn}$ for a function preceding the softmax function, wherein the gradient loss elements $g_{xn}$ are produced by element-wise multiplying the modulated gradient loss elements $g_{pn'}$ with the corresponding normalized output elements $p_n$,
wherein the first, second, and third circuits comprise a set of one or more computation units,
wherein at least one of the computation units comprises a multi-lane, multi-stage computation pipeline,
wherein the gradient loss elements $g_{pn}$ are converted from a first data format to a second data format using precision upconvert,
wherein, at first and second stages of the multi-lane, multi-stage computation pipeline, the accumulation C is element-wise subtracted in the second data format from corresponding ones of the gradient loss elements $g_{pn}$ to produce corresponding ones of the modulated gradient loss elements $g_{pn'}$ in the second data format,
wherein, at a third stage of the multi-lane, multi-stage computation pipeline, the normalized output elements $p_n$ are converted from the first data format to the second data format using precision upconvert,
wherein, at fourth and fifth stages of the multi-lane, multi-stage computation pipeline, corresponding ones of the normalized output elements $p_n$ are element-wise multiplied in the second data format with corresponding ones of the modulated gradient loss elements $g_{pn'}$ to produce corresponding ones of the gradient loss elements $g_{xn}$ in the second data format, and
wherein the corresponding ones of the gradient loss elements $g_{xn}$ are converted from the second data format to the first data format using precision downconvert.

13. The re-configurable processor of claim 12, further configured to:
generate a Jacobian matrix by determining a partial derivative of the normalized output elements $p_n$ of the softmax function over unnormalized input elements $x_n$ to the softmax function;
decompose the Jacobian matrix into diagonal entries and off-diagonal entries;
further decompose the off-diagonal entries into a vector of the normalized output elements $p_n$ and a transpose $p_n^T$ of the vector of the normalized output elements $p_n$;
element-wise multiply the gradient loss elements $g_{pn}$ with the corresponding normalized output elements $p_n$ of the transpose $p_n^T$; and
sum the results of the element-wise multiplication to produce the accumulation C.

14. The re-configurable processor of claim 12, wherein the gradient loss elements $g_{pn}$ of the softmax function are determined for a current classification module using backpropagation based on a loss function.

15. The re-configurable processor of claim 14, wherein the current classification module is part of a neural network.

16. The re-configurable processor of claim 15, wherein the neural network is a deep neural network.

17. The re-configurable processor of claim 12, wherein the number of multiplication operations required to produce the gradient loss elements $g_{xn}$ of the function preceding the softmax function are reduced from $n^2$ to n, where n is the dimensionality of the gradient loss elements $g_{pn}$ of the softmax function, the gradient loss elements $g_{xn}$ of the function preceding the softmax function, the normalized output elements $p_n$ of the softmax function, and the unnormalized input elements $x_n$ to the softmax function.

18. A computer-implemented method, comprising:
traversing, by a first circuit, gradient loss elements $g_{pn}$ of a softmax function and normalized output elements $p_n$ of the softmax function and producing an accumulation C, wherein the accumulation C is produced by element-wise multiplying the gradient loss elements $g_{pn}$ with the corresponding normalized output elements $p_n$ and summing the results of the element-wise multiplication;
element-wise subtracting, by a second circuit, the accumulation C from each of the gradient loss elements $g_{pn}$ and producing modulated gradient loss elements $g_{pn'}$; and
traversing, by a third circuit, the modulated gradient loss elements $g_{pn'}$ and producing gradient loss elements $g_{xn}$ for a function preceding the softmax function, wherein the gradient loss elements $g_{xn}$ are produced by element-wise multiplying the modulated gradient loss elements $g_{pn'}$ with the corresponding normalized output elements $p_n$,
wherein the first, second, and third circuits comprise a set of one or more computation units,
wherein at least one of the computation units comprises a multi-lane, multi-stage computation pipeline,
wherein the gradient loss elements $g_{pn}$ are converted from a first data format to a second data format using precision upconvert,
wherein, at first and second stages of the multi-lane, multi-stage computation pipeline, the accumulation C is element-wise subtracted in the second data format from corresponding ones of the gradient loss elements $g_{pn}$ to produce corresponding ones of the modulated gradient loss elements $g_{pn'}$ in the second data format,
wherein, at a third stage of the multi-lane, multi-stage computation pipeline, the normalized output elements $p_n$ are converted from the first data format to the second data format using precision upconvert,
wherein, at fourth and fifth stages of the multi-lane, multi-stage computation pipeline, corresponding ones of the normalized output elements $p_n$ are element-wise multiplied in the second data format with corresponding ones of the modulated gradient loss elements $g_{pn'}$ to produce corresponding ones of the gradient loss elements $g_{xn}$ in the second data format, and
wherein the corresponding ones of the gradient loss elements $g_{xn}$ are converted from the second data format to the first data format using precision downconvert.

19. The computer-implemented method of claim 18, further comprising:
generating a Jacobian matrix by determining a partial derivative of the normalized output elements $p_n$ of the softmax function over unnormalized input elements $x_n$ to the softmax function;
decomposing the Jacobian matrix into diagonal entries and off-diagonal entries;
further decomposing the off-diagonal entries into a vector of the normalized output elements $p_n$ and a transpose $p_n^T$ of the vector of the normalized output elements $p_n$;
element-wise multiplying the gradient loss elements $g_{pn}$ with the corresponding normalized output elements $p_n$ of the transpose $p_n^T$; and
summing the results of the element-wise multiplication to produce the accumulation C.

20. The computer-implemented method of claim 18, wherein the gradient loss elements $g_{pn}$ of the softmax function are determined for a current classification module using backpropagation based on a loss function.

* * * * *